United States Patent [19]
Fujima

[11] Patent Number: 5,860,740
[45] Date of Patent: *Jan. 19, 1999

[54] THERMOMETER

[75] Inventor: Mikako Fujima, Kunitachi, Japan

[73] Assignee: Casio Computer Co., Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 405,231

[22] Filed: Mar. 16, 1995

[30] Foreign Application Priority Data

| Mar. 22, 1994 | [JP] | Japan | 6-075358 |
| Apr. 11, 1994 | [JP] | Japan | 6-097969 |
| Apr. 11, 1994 | [JP] | Japan | 6-097971 |
| Jun. 9, 1994 | [JP] | Japan | 6-150639 |

[51] Int. Cl.$^6$ .............................. G01J 5/02; G01K 13/00
[52] U.S. Cl. ...................... 374/126; 374/128; 374/142; 368/11
[58] Field of Search ............................ 374/126, 128, 374/141, 142; 368/11

[56] References Cited

U.S. PATENT DOCUMENTS

| 4,447,884 | 5/1984 | Wada | 374/102 |
| 4,881,823 | 11/1989 | Tanaka et al. | 374/126 |
| 4,895,454 | 1/1990 | Kammleiter et al. | 374/163 |
| 5,024,533 | 6/1991 | Egawa et al. | 374/126 |
| 5,033,010 | 7/1991 | Lawrence et al. | 374/102 |
| 5,089,874 | 2/1992 | DeGuchi et al. | 257/48 |
| 5,094,544 | 3/1992 | Ignatowicz | 374/126 |

FOREIGN PATENT DOCUMENTS

| 0411121 A1 | 2/1991 | European Pat. Off. . | |
| 0417791 A2 | 3/1991 | European Pat. Off. . | |
| 0075786 | 4/1984 | Japan | 374/126 |
| 93/25875 | 12/1993 | WIPO . | |

OTHER PUBLICATIONS

Patent Abstracts of Japan, vol. 13, No. 276 (P–890) Jun. 26, 1989 [JP–A–01 066525 (Minolta Camera Co., Ltd.), Mar. 13, 1989].

Patent Abstracts of Japan, vol. 16, No. 451 (P–1424) Sep. 18, 1992 [JP–A–04 158229 (Mitsubishi Electric Corp.) Jun. 1, 1992].

Patent Abstracts of Japan, vol. 14, No. 286 (P–1064) Jun. 20, 1990 [JP–A–02 087026 (Mitsubishi Electric Corp.) Mar. 27, 1990].

"Portable Infared Pyrometer," Model 05–630, The Infrared Temperature Handbook by Omega Engineering, Inc., Stamford, CT, pp. 21, 116, 117 (1994).

Bernard, B., "Determining Emissivity," Instruments & Control Systems, vol. 37, #5, pp. 87–89 (May 1964).

McGee, T., "Principles and Methods of Temperature Measurement," p. 333, John Wiley & Sons (1988).

*Primary Examiner*—Christopher M. Fulton
*Attorney, Agent, or Firm*—Frishauf, Holtz, Goodman, Langer & Chick

[57] ABSTRACT

A thermometer is provided with a ROM, in which a program for controlling a CPU and plural predetermined emissivity data are memorized, and is further provided with a RAM having plural registers, in which plural emissivity data are entered and memorized. One of these memorized emissivity data is selected and used for measuring a temperature of an object. The selected emissivity data and an output of a temperature sensor are amplified by an amplifier, and are supplied to an A/D convertor to obtain digital data. The CPU processes the digital data to obtain temperature data, and displays the obtained temperature data. With this structure of the thermometer, emissivity data can be set with a simple operation.

8 Claims, 28 Drawing Sheets

| DISPLAY REGISTER ||||||||||
|---|---|---|---|---|---|---|---|---|---|
| M | N | L | c | i | j | α | β | q | TIME COUNTING REGISTER |

| | DATE. TIME | COMMENT DATA | TEMPERATURE DATA | NO. |
|---|---|---|---|---|
| E1 | | | | |
| E1 | | | | |
| E2 | | | | |
| E3 | | | | |
| E50 | | | | |

| MM | MS | Y1 | Y2 | Y3 |
|---|---|---|---|---|

FIG.7

| DISPLAY REGISTER | | | | |
|---|---|---|---|---|
| PRESENT TIME | | STOP WATCH | | |
| ALARM | | M | N | L |
| BL2 | BL3 | BL4 | | BL5 |
| P1 | | | | |
| 0 | 57 | 1 | | 37.8 |
| 0 | 61 | 1 | | 36.8 |
| 0 | 59 | 1 | | 36.5 |
| 0 | 63 | 1 | | 37.1 |
| ~ | ~ | ~ | | ~ |
| 1 | 36.5 | | | |
| 1 | 38.1 | | | |

FIG.25

THERMOMETER

BACKGROUND OF THE INVENTION

1. Field of the Invention

The present invention relates to a thermometer for measuring a temperature of an object under measurement depending on infrared ray energy emitted from the object.

2. Description of Prior Art

Thermometers have been widely known, which use a temperature sensor such as a thermopile and the like. The thermopile is used as a thermometer for measuring a surface temperature of an object under measurement without touching the object, which thermopile absorbs infrared ray energy emitted from an object under measurement, generates an electromotive force depending on the absorbed infrared ray energy, and converts electric characteristics such as changes in the electromotive force into an electric signal to measure a surface temperature of the object. The thermopile detects a temperature difference between the object under measurement and the thermopile itself, and adds an ambient temperature to the detected temperature difference to obtain a temperature of the object.

Further, thermometers using the thermopile calculate a temperature using as a reference a real black object which absorbs absolutely infrared rays, and, therefore, an emissivity is set to calculate a temperature of an object.

When a temperature measurement is made with the above thermometer using the thermopile, the emissivity has to be set for every temperature measurements. Therefore, the thermometers using the thermopile inherently have defects that, when making a temperature measurement of an object, a user is required to know the emissivity of the object, or to have data concerning the emissivity at hand.

Further, the thermopile can receive infrared rays emitted from an object other than the object under measurement. For example, the thermopile receives infrared light rays reflected on members such as a cover provided in the vicinity of the thermopile, and, therefore, the thermopile has another defect that a precise temperature of the object cannot always be measured.

Furthermore, the thermopile memorizes plural temperature data, but if it memorizes only temperature data without other data attached thereto, it is difficult to judge from which object the memorized temperature data was obtained.

SUMMARY OF THE INVENTION

The present invention has been made to overcome the above mentioned defects, and an an object to provide a radiation thermometer in which an emissivity can be set with a simple operation.

Another object of the present invention is to provide a radiation thermometer in which it can be confirmed, without error, that on which object a temperature measurement has been made, i.e., to which object the measured temperature belongs.

Another object of the invention is to provide a radiation thermometer which prevents infrared rays of an object other than the object under measurement from entering a temperature sensor thereof for measuring a precise temperature of the object.

According to one aspect of the present invention, there is provided a radiation thermometer which comprises:

a memory for previously storing plural emissivity data for measuring temperatures of objects under measurement;

a selector, such as an externally operable switch, for selecting one of the plural emissivity data stored in said memory; and a measuring device for measuring a temperature of the object under measurement with reference to the emissivity data selected by said selector means.

It would be apparent to those skilled in the art from the following description of preferred embodiments that the present invention may be modified in various ways and may be applicable to other apparatus.

BRIEF DESCRIPTION OF THE DRAWINGS

Other objects and structures of the present invention will be more fully understood from the description, when taken in conjunction with the accompanying drawings, in which:

FIG. 7 is a view showing a structure of a memory in the wrist watch in the first embodiment of the present invention;

FIG. 25 is a view showing a structure of RAM of the wrist watch in the fifth embodiment;

DETAILED DESCRIPTION OF PREFERRED EMBODIMENTS

Now, preferred embodiments of a thermometer according to the present invention will be described in detail with reference to the accompanying drawings.

FIRST EMBODIMENT

Figure 1:
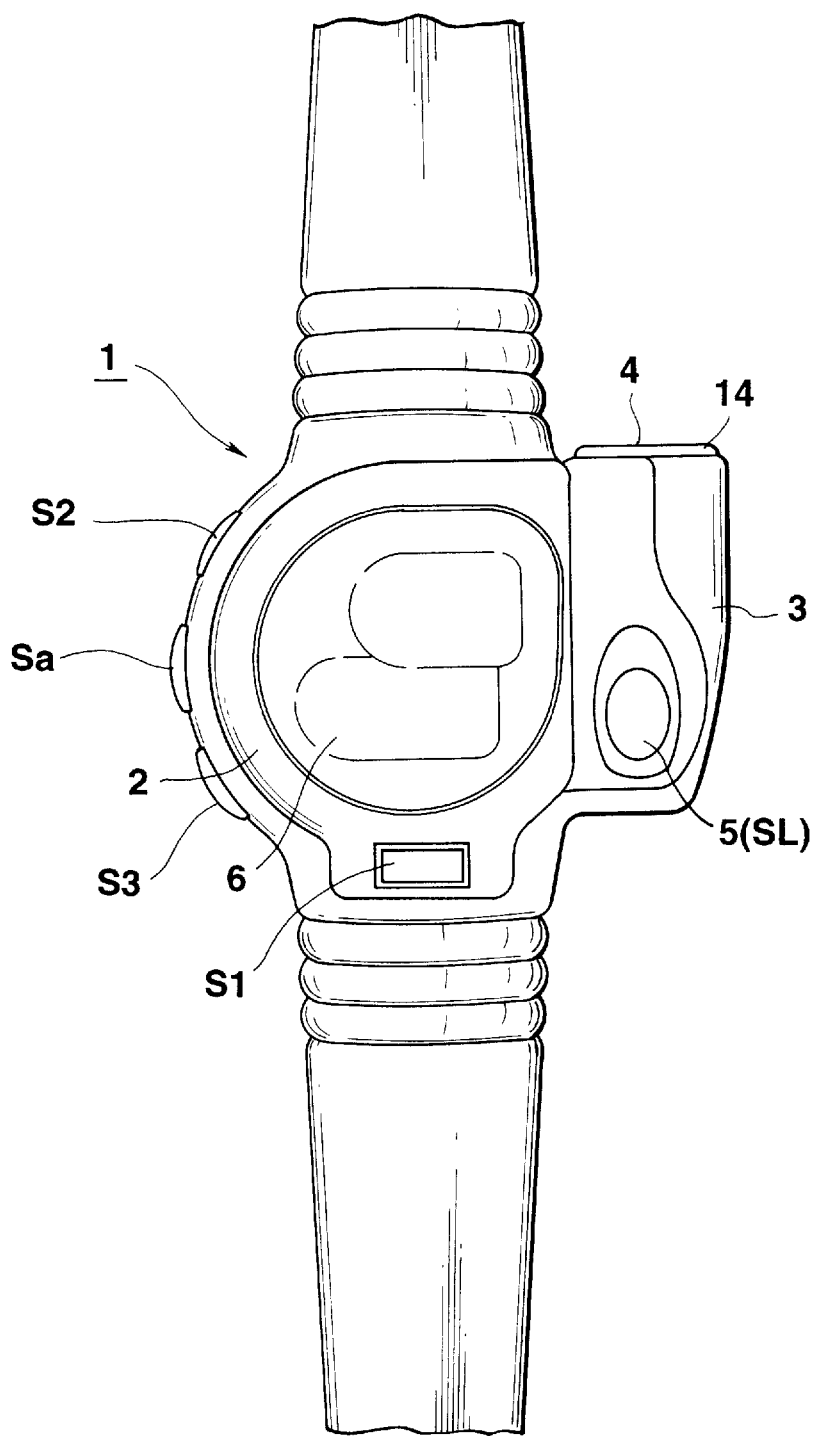
FIG. 1 is an external view of a wrist watch in which a first embodiment of a thermometer sensor according to the present invention is incorporated.

FIGS. 1–17 are views showing a first embodiment of a wrist watch incorporating the thermometer according to the present invention. In FIG. 1, a reference numeral 1 denotes an electronic wrist watch. A sensor module 8 incorporating a radiation temperature sensor (a thermopile) 7 is installed in a three o'clock side portion (a right side as viewed in FIG. 1) 3 of a casing 2 of the wrist watch 1. The sensor module 8 is provided with a window member 13 for allowing infrared ray energy to enter to the radiation temperature sensor 7. As is well known, the thermopile detects infrared rays emitted from an object under measurement, and generates a voltage in proportion to the detected infrared ray amount. An opening 4 is formed in the casing 2 in a direction of twelve o'clock (a top direction as viewed in the drawings of FIG. 1). When a measurement button SL is operated with the opening 4 facing an object under measurement, infrared rays of wave length about 10 μm radiated from the object are measured. The measured amount of infrared rays is output from the radiation temperature sensor 7 to a large scale integrated circuit (LSI) (not shown) which is provided on a circuit board mounted within the casing 2. The LSI converts the received amount of infrared light into temperature data to be displayed on a display unit 6 of the wrist watch 1. The display unit 6 comprises a light emitting diode display, an electro-luminescence display, a liquid crystal display or a plasma display.

Figure 2:
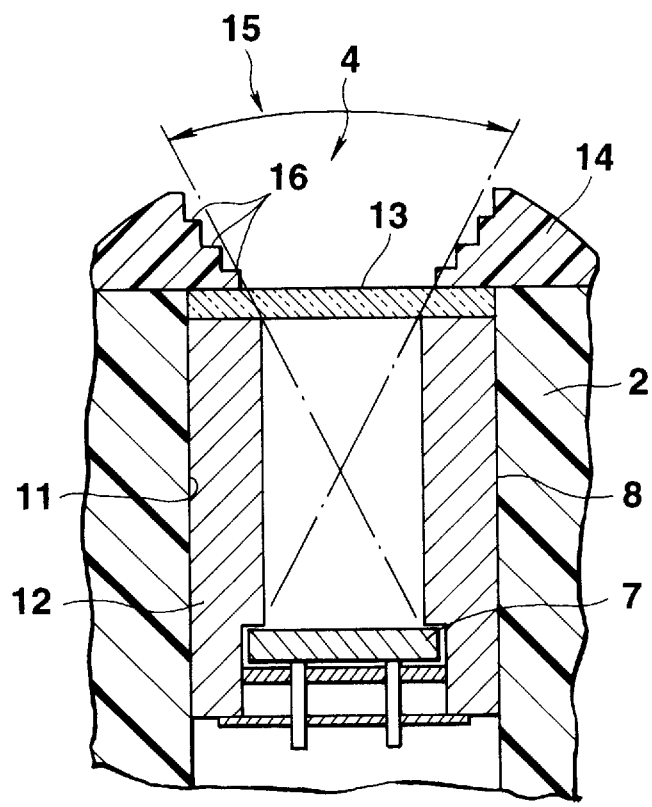
FIG. 2 is a cross sectional view of a portion in the vicinity of an opening formed in a casing in the first embodiment of the present invention.

FIG. 2 is a sectional view of the vicinity of the opening 4 formed in the twelve o'clock direction in a side portion 3 of the casing 2. A reference numeral 11 denotes a hole (or a recess) formed in the side portion 3 of the casing 2. A metal tube holder 12 is inserted into the hole 11, in which holder 12 the sensor module 8 incorporating the thermopile 7 is installed. A disk-type window member 13, for example, made of silicon, which has high permeability for infrared rays of a wavelength approximately 10 μm, is provided on the holder 12 so as to cover the sensor module 8.

Figure 3:
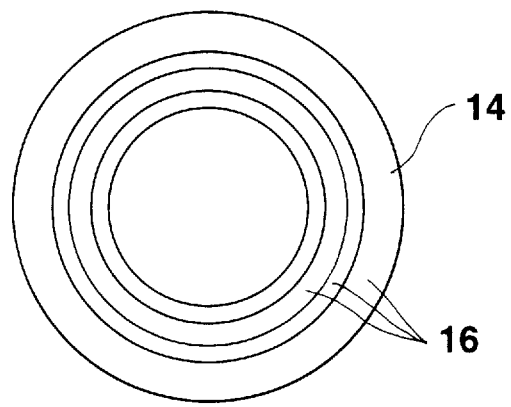
FIG. 3 is a plan view of a cover in the first embodiment.

A generally cone-shaped cover 14 is secured to the casing 2 by means of screws (not shown) so as to urge the peripheral edge of the window member 13 onto the holder 12 received in the casing 2. The cover 14 protects the window member 13 from external shock, and further retains and secures the sensor module 8 in the hole 11. The generally cone-shaped cover 14 has a stepped internal surface 16 as shown in FIGS. 2 and 3. The internal diameter of the cover 14 gets larger from the bottom to the top in a stepping manner, as shown in the cross sectional view of FIG. 2, so as to provide a view area 15 of the thermopile 7, as shown in FIG. 2.

In the electronic wrist watch with a temperature measuring function which has the above structure, since the cover 14 has the stepped internal surface 16, infrared rays which reach the cover 14 from outside of the view area 15 are reflected on stepped internal surface 16 of the cover 14, and only infrared rays which directly reach the window member 13 within the view area 15 are measured by thermopile 7. As described, infrared rays reflected on the stepped portions 16 and infrared rays outside the view area 15 never reach the thermopile 7 through the window member 13, and are not absorbed in the window member 13 to increase temperature of the thermopile 7. As a result, no influence of the reflected infrared rays is not given to an output of the thermopile 7, allowing a temperature measurement to be made with less error.

Returning to FIG. 1, reference symbols S1, S2, S3, SL and Sa denote switches for performing various functions. These switches are mounted on both side walls of the casing 2 of the wrist watch 1 as shown in FIG. 1. The switch S3 serves to switch operation modes among a time mode, a temperature measuring mode and a recall mode. Operation of the switch S3 successively switches the operation mode from the time mode, the temperature measuring mode, the recall mode and to the time mode. The switch S1 is for switching operation modes in the temperature measuring mode among a multi mode, a body mode, a snow mode and a set mode. Operation of the switch S1 successively switches the operation mode from the multi mode, the body mode, the snow mode, the set mode and to the multi mode. The switch Sa is for switching operation modes in the temperature measuring mode between a measurement/set mode and a letter input mode. Operation of the switch Sa successively switches the operation mode from the measurement/set mode, the letter input mode and again to the measurement/set mode. Description of the switches S2 and SL will be given later.

Figure 4:
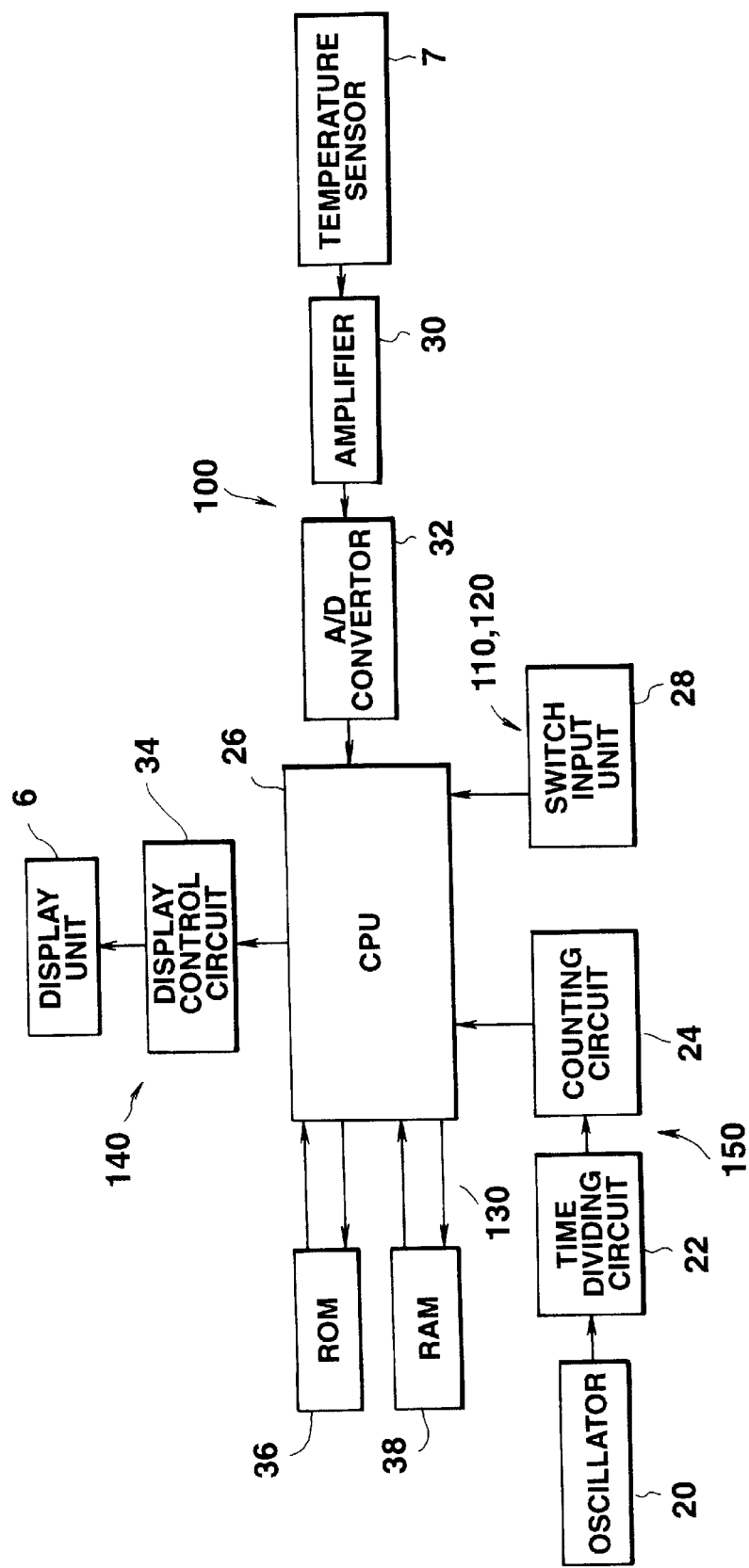
FIG. 4 is a circuit diagram of a wrist watch in the first embodiment.

FIG. 4 is a circuit diagram of the embodiment of the wrist watch 1. In FIG. 4, a reference number 20 is an oscillator generating a reference clock signal for time counting. A numeral 22 represents a time dividing circuit, which time divides the reference clock signal of the oscillator 20. A numeral 24 is a counting circuit, which counts an output signal from the time dividing circuit 22. The output signal of the counting circuit 24 is supplied to a central processing unit (CPU) 26. A switch input unit 28 includes the switches S1, S2, S3, SL and Sa, an output signal of which input unit 28 is also supplied to the CPU 26. A numeral 30 denotes an amplifier, which amplifies an output of the temperature sensor 7 to a predetermined level. An A/D convertor 32 converts an output of the amplifier 30 into a digital signal. The digital signal of the A/D convertor 32 is supplied to the CPU 26. A display control circuit 34 controls the display unit 6 in accordance with display data and a control signal from the CPU 26.

Figure 5:
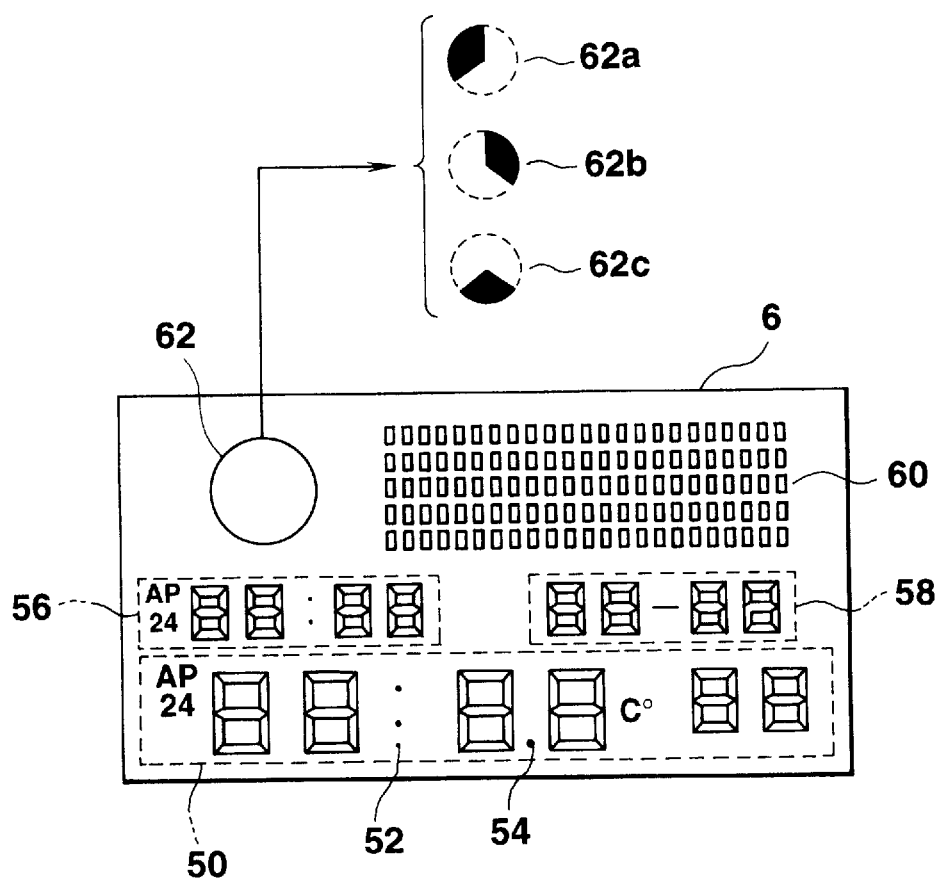
FIG. 5 is a view showing a display unit of the wrist watch in the first embodiment.

FIG. 5 is a view illustrating by way of example indications displayed on the display unit 6. In a display area 50 is displayed a current time, a temperature or an emissivity. The current time, temperature and emissivity are alternatively displayed within the display area 50 on the display unit 6. In the display area 50' a decimal point 52 is prepared for setting an emissivity and a decimal point 54 for displaying a temperature. In the recall mode, a time is displayed in a display area 56. A date is displayed in a display area 58. In the display area 58, the current time is displayed in the time mode and a memorized date is displayed in the recall mode. In a display area 60, letters representing a day of the week or input letters are displayed. An operation mode is displayed in a display area 62. In the display area 62, a mode mark 62a is displayed in the body mode, a mode mark 62b is displayed in the time mode, the multi mode, the set mode, the letter input mode and the recall mode. A mode mark 62c is displayed in the snow mode.

Figure 6:
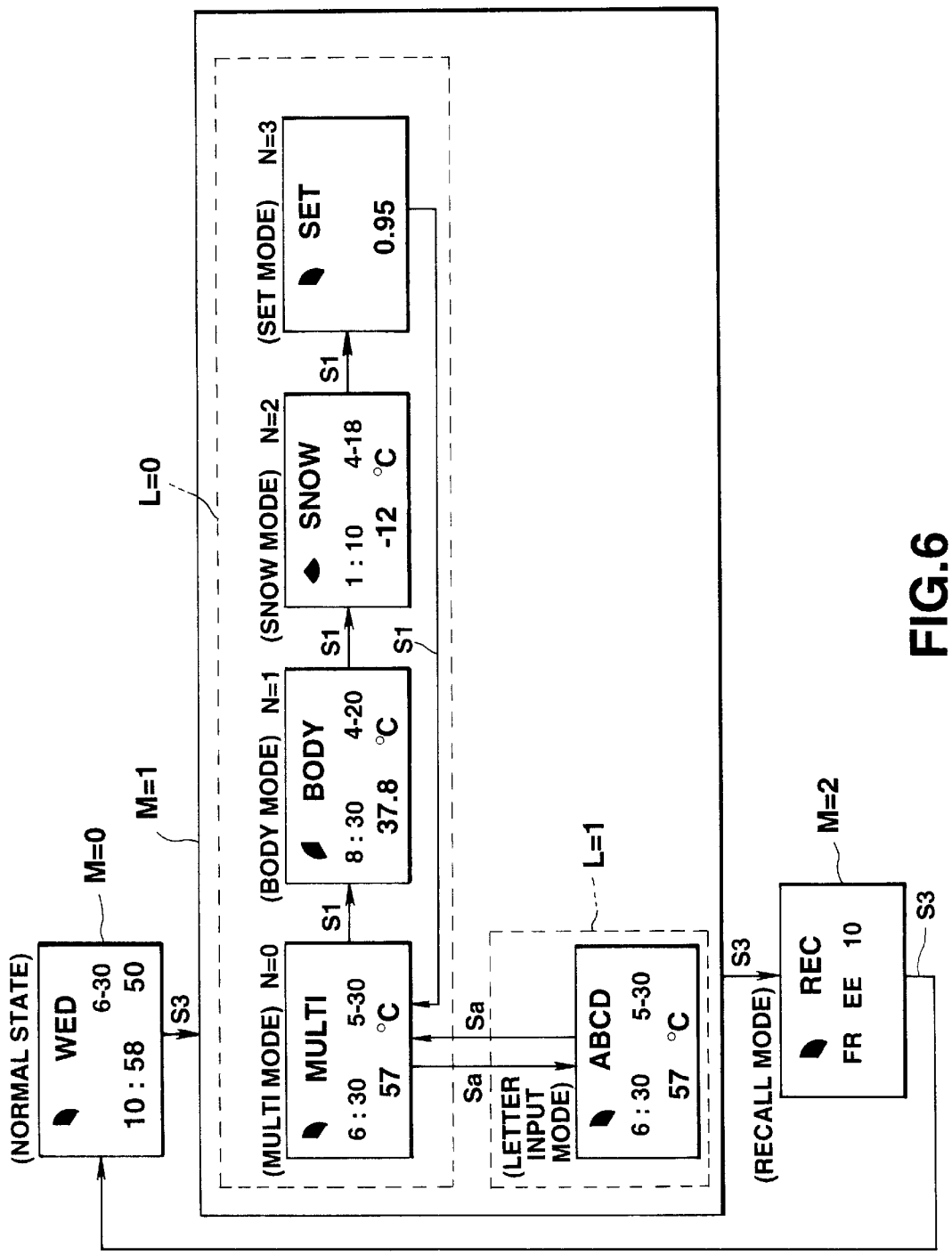
FIG. 6 is a view showing transitive indications displayed on the display unit of the wrist watch in the first embodiment.

FIG. 6 is a view illustrating transitive indications displayed on the display unit 6. In the time mode of M=0, a current time (10:58 50) is displayed in the display area 50. A date (6-30) is displayed in the display area 58. In the display area 60, an indication of a day of the week "WED" is displayed, and in the display area 62, the mode mark 62b is displayed.

In the temperature measuring mode of M=1, when L=0 and N=0, a measured temperature (57° C.) is displayed in the display area 50, and a time (6:30) of the measurement is displayed in the display area 56. Further, in the display area 58, a date (5-30) of the measurement is displayed, and in the display area 60, an indication of "MULTI" is displayed. The mode mark 62b is displayed in the display area 62.

In the temperature measuring mode of M=1, when L=0 and N=1, a measured temperature (37.8° C.) is displayed in the display area 50, and a time (8:30) of the measurement is displayed in the display area 56. Further, in the display area 58, a date (4-20) of the measurement is displayed, and in the display area 60, an indication of "BODY" is displayed. The mode mark 62a is displayed in the display area 62.

In the temperature measuring mode of M=1, when L=0 and N=2, a measured temperature (−12° C.) is displayed in the display area 50, and a time (1:10) of the measurement is displayed in the display area 56. Further, in the display area 58, a date (4-18) of the measurement is displayed, and in the display area 60, an indication of "SNOW" is displayed. The mode mark 62c is displayed in the display area 62.

In the temperature measuring mode of M=1, when L=0 and N=3, an emissivity (0.95) is displayed in the display area 50, and an indication of "SET" is displayed in the display area 62. The mode mark 62b is displayed in the display area 62.

In the temperature measuring mode of M=1, when L=1, a measured temperature (57° C.) is displayed in the display area 50, and a time (6:30) of the measurement is displayed in the display area 58. Further, in the display area 58, a date (5-30) of the measurement is displayed, and in the display area 60, an indication of "ABCD" is displayed, where "ABCD" are input letters. The mode mark 62b is displayed in the display area 62.

In the recall mode of M=2, an indication of "FREE" is displayed in the display area 56, and "10" is displayed in the display area 58. Further, in the display area 60, an indication of "REC", and the mode mark 62b is displayed in the display area 62. The indication "FREE" represents a number of left cases, and 10 cases are left.

Every operation of the switch S3 switches the operation mode in the order of the time mode (M=0), the temperature measuring mode (M=1) and the recall mode (M=2). In the temperature measuring mode, every operation of the switch S1 switches the operation mode in the order of the multi mode (N=0), the body mode (N=1), the snow mode (N=2) and the set mode (N=3). In the temperature measuring mode and the multi mode, every operation of the switch Sa switches between the letter input mode (L=1) and the multi mode of the measurement/set mode (L=0).

Returning to FIG. 4, a numeral 36 is a read only memory (ROM), in which program for controlling operation of the CPU 26, reference emissivities of a human body and snow are memorized. As well known, an emissivity is represented by a ratio of an area defined by a characteristic curve of infrared light energy radiation of an actual object divided by an area defined by a characteristic curve of infrared light energy radiation of a perfect black object. In a random access memory (RAM) 38 are set various memory areas such as registers, a memory area and data storing area.

FIG. 7 is a view showing structure of the RAM 38 of FIG. 4, in which various registers, memory areas and data memory areas are provided as follows:

MM: a memory in which input letters are memorized in the set mode;

MS: a memory in which a set emissivity is memorized in the set mode;

E1 to E50: memories in which fifty data each including date, time, comment data, temperature data and No. are memorized, at maximum;

date/time memories: memories in which dates and times when measurement is made are memorized;

comment data memories: memories in which names of objects under measurement or related names are memorized (when letters are memorized in the MM at temperature measurement, the letters are sent to the comment data memories);

temperature data memories: memories in which measured temperatures are memorized;

No. memories: data representing in which mode temperature measurement is made are memorized, and, for example, "0" represents that temperature measurement is made in the multi-mode, "1" represents that temperature measurement is made in the body mode, and "2" represents that temperature measurement is made in the snow mode;

M: a register used for switching the operation mode, and, for example, M=0 represents the time mode, M=1 represents the temperature measuring mode and M=2 represents the recall mode;

N: a register used for selecting an object under measurement and an emissivity, and, for example, N=0 represents the multi mode (in which measurement is made at an emissivity set in the set mode), N=1 represents the body mode, N=2 represents the snow mode and N=3 represents the set mode;

L: a register used to switch between the measurement/set mode and the letter input mode, and L=0 represents the measurement/set mode and L=1 represents the letter input mode;

C: a register for selecting a place in a number;

i: a register for memorizing number of measured temperatures;

j: a register used for judging whether snow data has been memorized (at which place in temperature data snow data is memorized);

α: a register used for judging whether multi data has been memorized (at which place in multi data snow data is memorized);

β: a register used for judging whether body data has been memorized (at which place in temperature data body data is memorized);

q: a register used for successively displaying measured temperature data in the reverse order in which the data were memorized;

a time counting register: a register used for counting time;

a display register: a register used for displaying various data;

Y1: a register used for judging whether temperature data measured in the multi mode has been memorized, and Y1=0 represents that no temperature data measured in the multi mode has been memorized, and Y1=1 represents that temperature data measured in the multi mode has been memorized;

Y2: a register used for judging whether temperature data measured in the body mode has been memorized, and Y2=0 represents that no temperature data measured in the body mode has been memorized, and Y2=1 represents that temperature data measured in the body mode has been memorized;

Y3: a register used for judging whether temperature data measured in the snow mode has been memorized, and Y3=0 represents that no temperature data measured in the snow mode has been memorized, and Y3=1 represents that temperature data measured in the snow mode has been memorized.

Temperature detecting means 100 comprises the temperature sensor 7, the amplifier 30, the A/D convertor 32 and the CPU 26. Data input means 110 or emissivity data setting means 120 comprises the switch unit 28 and the CPU 26. Memory means 130 comprises the CPU 26 and the RAM 38. Display means 140 comprises the display unit 6, the display control circuit 34 and the CPU 26. The time counting means 150 comprises the oscillator 20, the time dividing circuit 22, the counting circuit 24 and the CPU 26.

Operation of the embodiment of the wrist watch 1 with the above structure will be described in accordance with the accompanying flowcharts.

Figure 8:
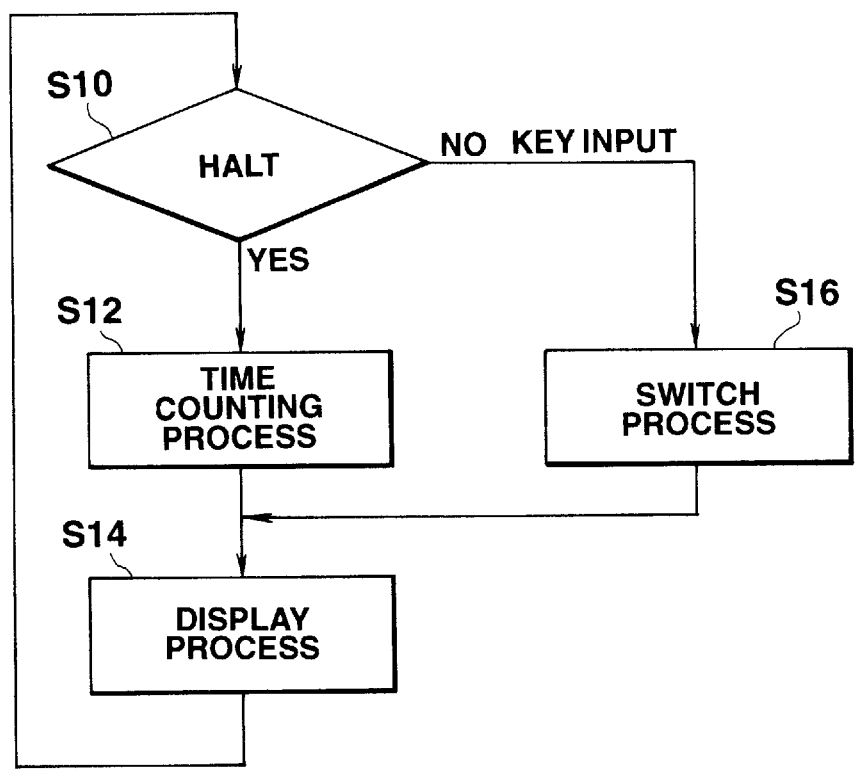
FIG. 8 is a flowchart showing the general operation of the wrist watch.

(I) Main Process:

FIG. 8 is a flowchart of the main process of the present embodiment. At step S10 it is judged whether a key input data is input. When it is determined that no key input data is input (when NO), the operation advances to step S12, where a time counting process is executed. Then, at step S14, a displaying process is performed. Meanwhile, when it is determined at step S10 that key input data is input (when YES), the operation advances to step S16, where a switch process is performed. Then, at step S14 a display process is performed in accordance with the switch process.

(II) Switch Process:

FIGS. 9–14 are views showing flowcharts.

Figure 9:
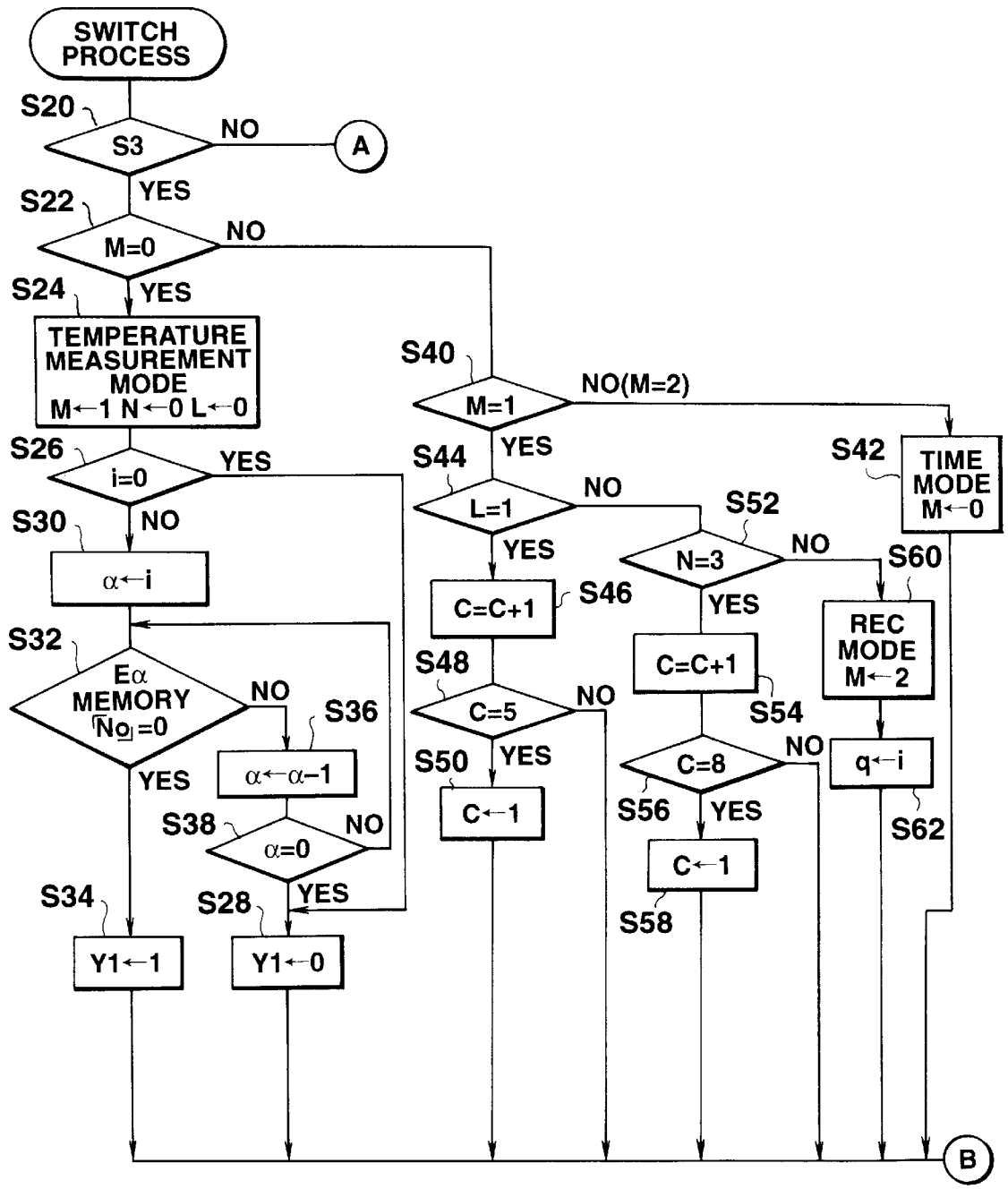
FIG. 9 is a flowchart of a switching process of the wrist watch.

It is judged at step S20 of FIG. 9 whether the switch 3 is operated. When YES (when it is determined that the switch 3 is operated), it is judged at step S22 whether a value of the M register is "0". In other words, it is judged whether the switch S3 is operated in the time mode. When YES (when it is determined that the switch 3 is operated in the time mode), the operation mode is switched to the temperature measuring mode, where the register M is set to "1" (the temperature measuring mode), the register N to "0" (the multi mode), and the register L to "0" (the measurement/set mode).

After setting the registers M, N and L, it is judged at step S26 whether the register i, which stores number of measured temperatures, is "0". When YES, i.e., when it is determined that no measured temperature is memorized, the register Y1 is set to "0" at step S28, which means that no temperature data measured in the multi mode is memorized.

At step S26, when it is determined that at least one measured temperature is memorized, a content of the register i is set to the register α at step S30. It is judged at step S32 whether a value of No. in an Eα memory designated by the value of the register α is "0". In other words, it is judged at step S32 whether temperature data measured in the multi mode has been memorized.

When YES (when it is determined that temperature data measured in the multi mode has been memorized), the register Y1 is set to "1" at step S34 and the switch process is finished. When it is determined at step S32 that temperature data measured in the multi mode has not been memorized, the value of the register α is subtracted by "1" at step S36. Then, it is judged at step S38 whether the register a is set to "0". When YES, it is determined that temperature data measured in the multi mode has not been memorized, and the operation goes to step S28. Then, the register Y1 is set to "0" at step S28 and the switch process is finished. When it is determined at step S38 that the register α is not set to "0", the operation returns to step S32, where it is judged whether temperature data measured in the multi mode has been memorized in the previous Eα memory. When it is determined at step S32 that temperature data measured in the multi mode has not been memorized in the previous Eα memory, the operation goes to step S36, while it is determined at step S32 that temperature data measured in the multi mode has been memorized in the previous Eα memory, the operation goes to step S34. When it is determined at step S38 after step S36 that the register a has been set to "0", the register Y1 is set to "0" at step S28 and the switch process is finished. That is, it is determined that no temperature data measured in the multi mode has been memorized, and the switch process is finished.

When, in a process program from step S20 to step S38, the switch S3 is operated in the time mode, the operation mode is switched to the temperature measuring mode. When no temperature data has been obtained, it is determined that no temperature data measured in the multi mode has been memorized, and the process is finished. When at least one measured data has been obtained, a value of the register i is set to the register α. When No. of the Eα memory corresponding to the value of the register α is "0", it is determined that temperature data measured in the multi mode has been memorized, and the process is finished. When No. of the Eα memory is not set to "0", "1" is subtracted from the value of the register α. When the resultant value of the register a is not "0", it is judged whether No. of the Eα memory corresponding to the value of the register α is "0". When YES, it is determined that temperature data measured in the multi mode has been memorized, and the process is finished. The processes from step S32 to step S38 are repeatedly executed, until the value of the register a will be "0", i.e., until temperature data is obtained in the multi mode. If the temperature is not obtained, it is determined that no temperature data measured in the multi mode has been memorized, and the process is finished.

Meanwhile, when it is determined at step S22 that the switch S3 has not been operated in the time mode, it is judged at step S40 whether the switch S3 is operated in the temperature measuring mode. When it is determined that the switch S3 is not operated in the temperature measuring mode, it is determined that the switch S3 is operated in the recall mode. At step S42, a value "0" is set to the register M to set the time mode, and the process is finished. When it is determined that the switch S3 is operated in the temperature measuring mode, it is judged at step S44 whether a value of the register L is "1", i.e., it is judged whether the letter input mode has been set. When it is determined that the letter input mode has been set, a value "1" is added to the register C (for designating a place in a number) at step S46. It is judged at step S48 whether the register C has been set to a value "5". When NO, the process is finished. When it is determined at step S48 that the register C has been set to a value "5", the register C is set to a value "1" at step S50. That is, the register C is set to an initial value, and the process is finished. In other words, the register C is set to "1", when five letters have been input in the letter input mode.

When it is determined at step S44 that a value of the register L is not "1", i.e., it is determined that the letter input mode is not set, it is judged at step S52 whether a value of the register N is "3", i.e., it is judged whether the set mode has been set. When YES, a value "1" is added to the register C at step S54. It is judged at step S56 whether the register C is set to a value "8". That is, it is judged whether an emissivity has been input. In this case, since five letters and three digits for the emissivity have been input, eight digits or eight letters have been input in total. When it is determined that the emissivity has not been input, the process is finished. When it is determined that the emissivity has been input, the register C is set to "1" at step S58, i.e., the register is set to the initial value, and the process is finished.

When it is determined at step S52 that a value of the register N is not "3", i.e., it is determined that the set mode has not been set, a value "2" is set to the register M to switch to the recall mode at step S60. At step S62, the value of the register i is set to the register q.

If, in a process program from step S40 to step S62, the switch S3 was not operated in the temperature measuring mode, it is determined that the switch S3 was operated in the recall mode. Therefore, the operation mode is switched to the time mode. When the switch S3 was operated in the temperature mode and in the letter input mode, a process is executed for advancing a place in the input letters. Meanwhile, when the switch S3 was operated in the temperature mode and in the set mode, a process is executed for advancing a place in the set input. When the switch S3 was not operated either in the input mode or in the set mode, the operation mode is switched to the recall mode.

Figure 10:
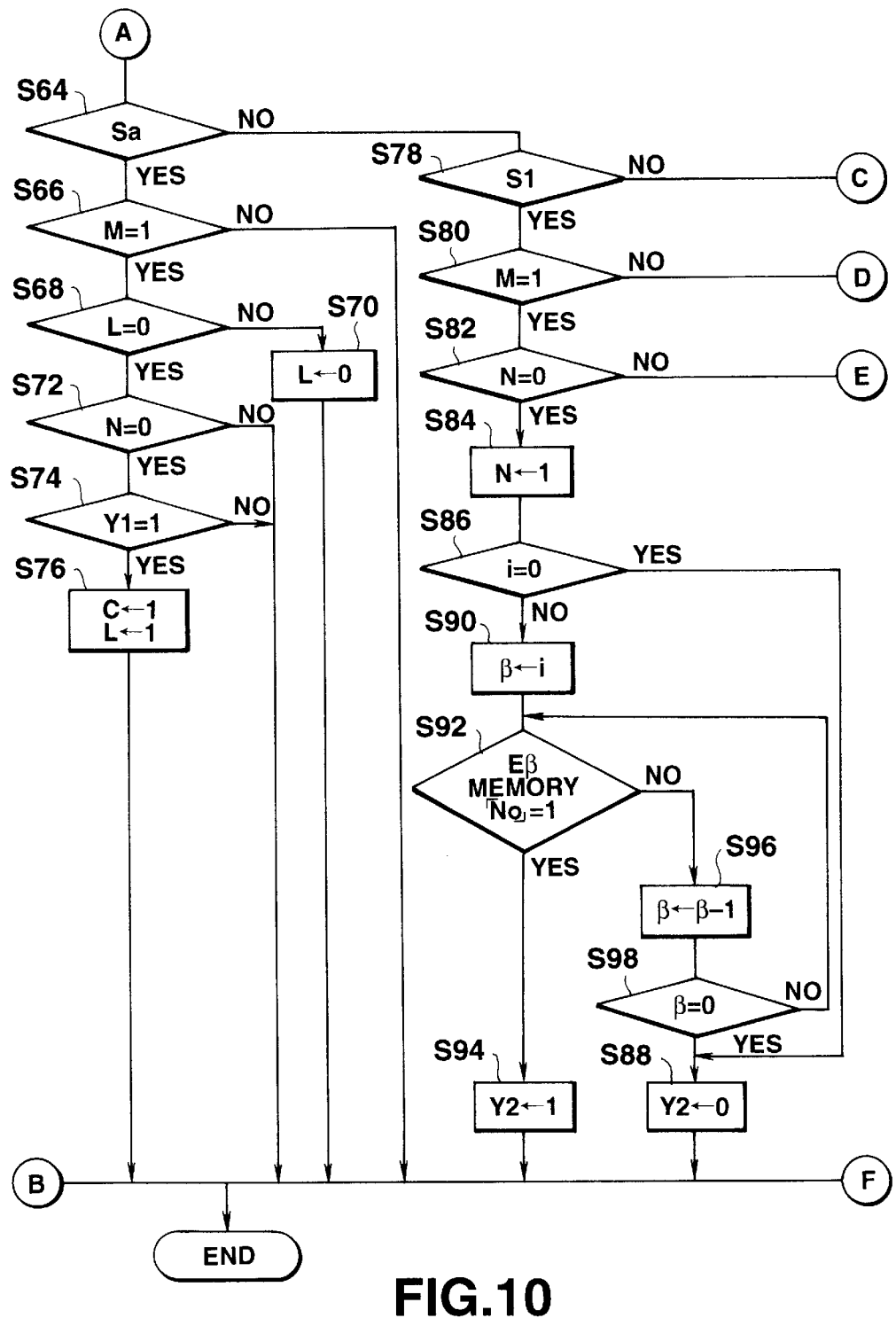
FIG. 10 is a flowchart of a switching process branching off from step S20 in FIG. 9.

When it is determined at step S20 that the switch S3 is not operated, it is judged at step S64 of FIG. 10 whether the switch Sa has been operated. When YES, it is judged at step S66 whether a value of the register M is "1", i.e., it is judged whether the switch Sa is operated in the temperature measuring mode. When it is determined that the switch Sa is not operated in the temperature measuring mode, the process is finished. When it is determined that the switch Sa is operated in the temperature measuring mode, it is judged at step S68 whether a value of the register L is "0", i.e., whether the measurement/set mode has been set. When No, the register L is set to "0" at step S70, i.e., the operation mode is set to the measurement/set mode and the process is finished.

When it is determined that a value of the register L is "0", i.e., that the operation mode has been set to the measurement/set mode, it is judged at step S72 whether a value of the register N is "0", i.e., whether the multi mode has been set. When NO, then the process is finished. When it is determined that the multi mode has been set, it is judged at step S74 whether a value of the register Y1 is "1", i.e., whether temperature data measured in the multi mode is memorized. When NO, then the process is finished. Meanwhile when it is determined that temperature data measured in the multi mode is memorized, both the registers C and L are set to "1" at step S76, i.e., the operation mode is set to the letter input mode. Then, the process is finished.

If, in a process program from step S64 to step S76, the switch Sa was operated in the temperature measuring mode and not in the measurement/set mode, the operation mode is switched to the measurement/set mode. Meanwhile, if the measurement/set mode has been set and temperature data measured in the multi mode has been memorized, the register C is set to "1" and the operation mode is switched to the letter input mode.

When it is determined at step S64 that the switch Sa has not been operated, it is judged at step S78 whether the switch S1 is operated. When YES, it is judged at step S80 whether the switch S1 is operated in the temperature measuring mode. When it is determined that the switch S1 is not operated in the temperature measuring mode, the process is finished. When it is determined that the switch S1 is operated in the temperature measuring mode, it is judged at step S82 whether a value of the register N is "0", i.e., whether the multi mode has been set. When YES, the register N is set to "1" at step S84, i.e., the operation mode is set to the body mode. After the body mode has been set, it is judged at step S86 whether a value of the register i is "0", i.e., whether temperature data has been obtained. When it is determined that the value of the register i is "0", the register Y2 is set to a value "0" at step S88, and then the process is finished. In other words, it is determined that no temperature data has been memorized in the body mode, and the process is finished. When it is determined that the value of the register i is not "0", the value of the register i is set to the register $\beta$ (this register indicates whether body data is memorized or not).

After the value of the register i has been set to the register $\beta$, it is judged at step S92 whether "No." of E$\beta$ memory represented by the value of the register $\beta$ is "1", i.e., whether any body data has been memorized. When it is determined from the current value of the register $\beta$ that body data has been memorized, the register Y2 is set to "1" at step S94, and then the process is finished. Meanwhile, when it is determined that "No." of E$\beta$ memory represented by the current value of the register $\beta$ is not "1", "1" is subtracted from the value of the register $\beta$ at step S96. Then, if it is determined that the resultant value of the register $\beta$ is not "0", the operation returns to step S92, where it is judged again whether "No." of E$\beta$ memory represented by the value of the register $\beta$ is "1". When it is determined at step S98 that the resultant value of the register $\beta$ is "0", the register Y2 is set to "0" at step S88, and the process is finished. That is, it is determined that no temperature data measured in the body mode has been memorized, and the process is finished.

When, in a process program from step S78 to step S98, the switch S1 is operated in the temperature measuring mode but not in the multi mode, the operation mode is switched to the body mode. When no temperature data has been measured, it is determined that no temperature data measured in the body mode has been memorized, and the process is finished. Meanwhile when at least one measured data has been obtained, number of the measured data is set to the register $\beta$. It is judged whether "No." of the E$\beta$ memory corresponding to the value of the register $\beta$ is "1", i.e., whether temperature is measured in the body mode. When temperature is measured in the body mode, it is determined that temperature data obtained in the body mode is memorized and the process is finished. Meanwhile, when it is determined from the current value of the register $\beta$ that temperature has not been measured in the body mode, "1" is subtracted from the value of the register $\beta$. It is judged from the resultant value of the register $\beta$ whether temperature has been measured in the body mode. These processes will be executed repeatedly until the value of the register $\beta$ reaches "0". When the value of the register $\beta$ reaches "0", it is determined that no temperature data has been obtained in the body mode and the operation is finished.

Figure 11:
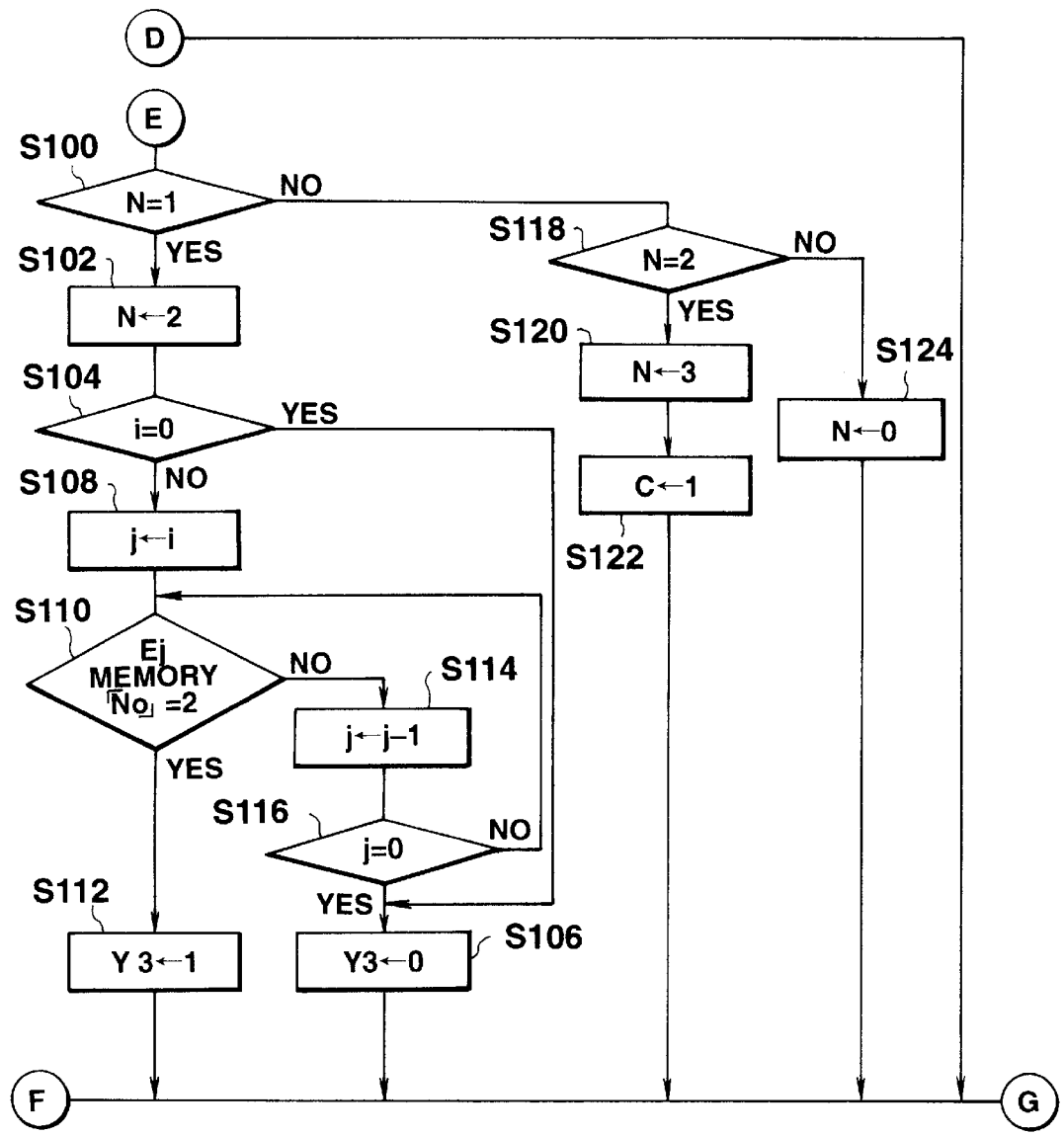
FIG. 11 is a flowchart of a switching process branching off from steps of FIG. 10.

When it is determined at step S82 that the multi mode has not been set, it is judged at step S100 of FIG. 11 whether a value of the register N is "1", i.e., whether the body mode has been set. When YES, the register N is set to "2" at step S102, i.e., the operation mode is switched to the snow mode. After the snow mode has been set, it is judged at step S104 whether a value of the register i is "0". When it is determined that the value of the register i is "0", the register Y3 is set to 0 at step S106 and the process is finished. Meanwhile, when it is determined that the value of the register i is not "0", the value of the register i is set to the register j at step S108.

After the value of the register i has been set to the register j, it is judged at step S110 whether "No." of the Ej memory represented by the value of the register j is "2", i.e., whether any data is memorized in the snow mode. When it is determined from the current value of the register j that data has been memorized in the snow mode, the register Y3 is set to "1 at step S112, and then the process is finished. That is, it is determined that temperature data measured in the snow mode is memorized, it and the process is finished. Meanwhile, it is determined that "No." of the Ej memory represented by the value of the register j is not "2", "1" is subtracted from the value of the register j at step S114. Then, if it is determined at step S116 that the resultant value of the register j is not "0", the operation returns to step S110, where it is judged again whether "No." of Ej memory represented by the value of the register j is "2". When it is determined at step S106 that the resultant value of the register j is "0", the register Y3 is set to "0" at step S106, and the process is finished. That is, it is determined that no temperature data measured in the snow mode has been memorized, and then the process is finished.

When it is determined at step S100 that the body mode has not been set, it is judged at step S118 whether a value of the register N is "2", i.e., whether the snow mode has been set. When YES, the register N is set to "3" at step S120, i.e., the operation mode is switched to the set mode. After the set mode has been set, the value of the register C is set to "1" at step S122, and the process is finished. When it is determined at step S118 that the snow mode has not been set, the value of the register N is set to "0" in step S124.

When, in a process program from step S100 to step S116, the switch S1 is operated in the temperature measuring mode and in the body mode, the operation mode is switched to the snow mode. When no temperature data has been measured, it is determined that no temperature data measured in the snow mode has been memorized, and the process is finished. Meanwhile when at least one measured data has been obtained, the number of the measured data is set to the register j. It is judged whether "No." of the Ej memory represented by the value of the register j is "2", i.e., whether temperature is measured in the snow mode. When temperature has been measured in the snow mode, it is determined that temperature data obtained in the snow mode is memorized and the process is finished. Meanwhile, when it is determined from the current value of the register j that temperature has not been measured in the snow mode, "1" is subtracted from the value of the register j. It is judged from the resultant value of the register j whether temperature has been measured in the snow mode. These processes will be executed repeatedly until the value of the register j reaches "0". When the value of the register j reaches "0", it is determined that no temperature data has been measured in the snow mode and the process is finished.

When the switch S1 is operated in the temperature measuring mode and the snow mode has been set at the time, the operation mode is switched from the snow mode to the set mode at step S120. After the set mode has been set, the register C is set to "1" at step S122. Meanwhile, that is, when the switch S1 is operated in the temperature measuring mode and when the set mode has been set at the time, the operation mode is switched to the multi mode, and the process is finished.

Figure 12:
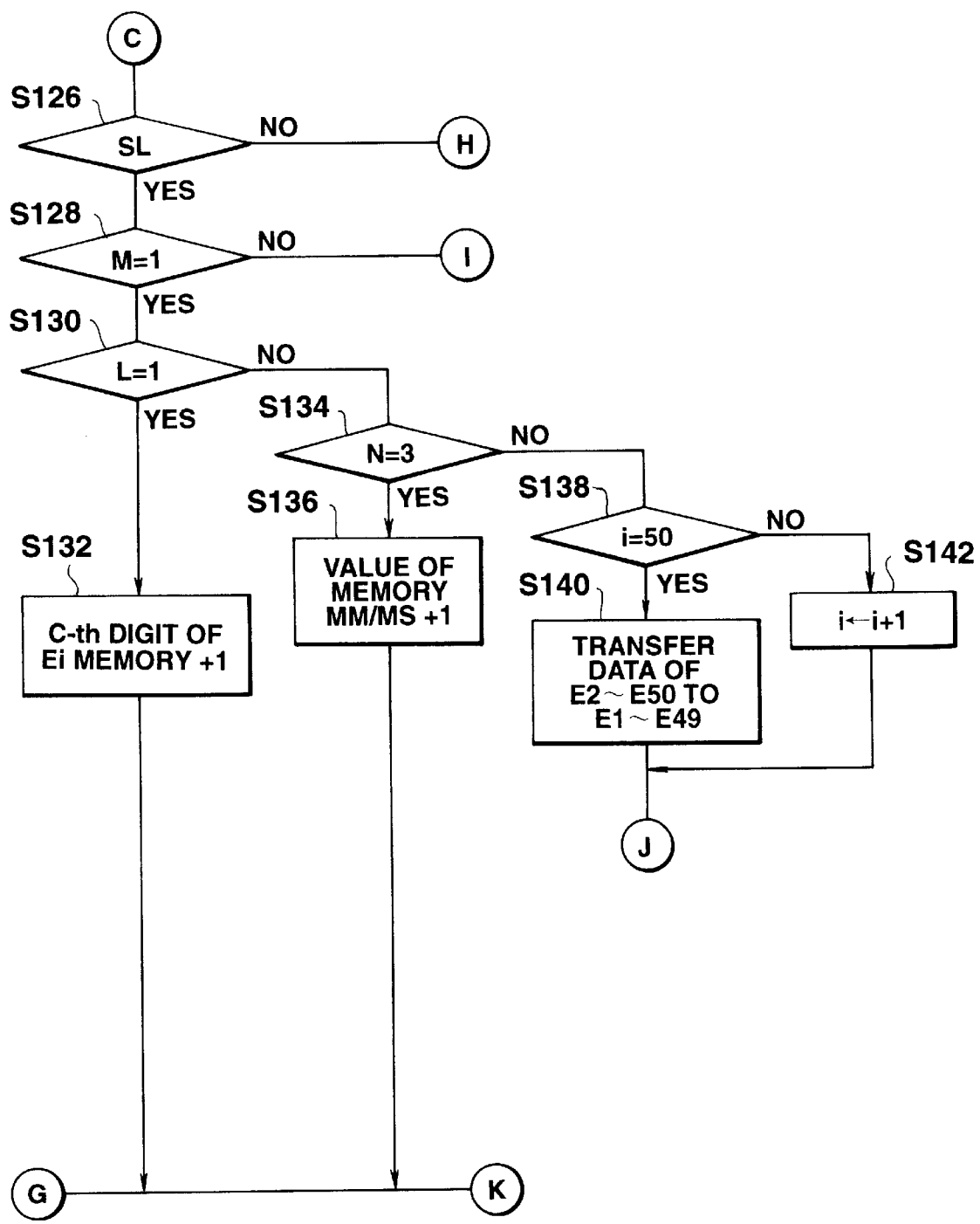
FIG. 12 is a flowchart of a switching process branching off from a step of FIG. 10.

When it is determined at step S78 that the switch S1 is not operated, it is judged at step S126 of FIG. 12 whether the switch SL has been operated. When YES, it is judged at step S128 whether a value of the register M is "1", i.e., it is judged whether the switch SL is operated in the temperature measuring mode. When it is determined that the switch SL is operated in the temperature measuring mode, it is judged at step S130 whether a value of the register L is "1", i.e., whether the letter input mode is set. When YES, "1" is added to the C-th digit of comment data memorized in the Ei memory at step S132, and the process is finished. Meanwhile, when it is not determined that the letter input mode is set, it is judged at step S134 whether a value of the register N is "3", i.e., whether the set mode has been set. When YES, "1" is added to a designated digit of the MM or MS memory at step S136, and the process is finished.

Meanwhile, when it is determined at step S134 that the set mode is not set, it is judged at step S138 whether a value of the register i is "50". When YES, data in the memories E2–E50 are transferred to the memories E1–E49, respectively, at step S140. In other words, a process is performed at step S140 to make the 50-th memory be ready for receiving the last data at all times. Meanwhile, when it is determined that the value of the register i is not "50", "1" is added to the value of the register i at step S142.

When, in a process program from step S126 to step S142, the switch SL is operated in the temperature measuring mode and in the measurement/set mode, "1" is added to the C-th digit of comment data memorized in the Ei memory, and the process is finished. Meanwhile, when it is determined that the switch SL is operated in the temperature measuring mode and also in the set mode, "1" is added to the designated digit of the memory MM or MS, and the process is finished. When it is determined that the value of the register i is "50", data in the memories E2–E50 are transferred to the memories E1–E49. When the value of the register i is less than "50", "1" is added to the register i.

Figure 13:
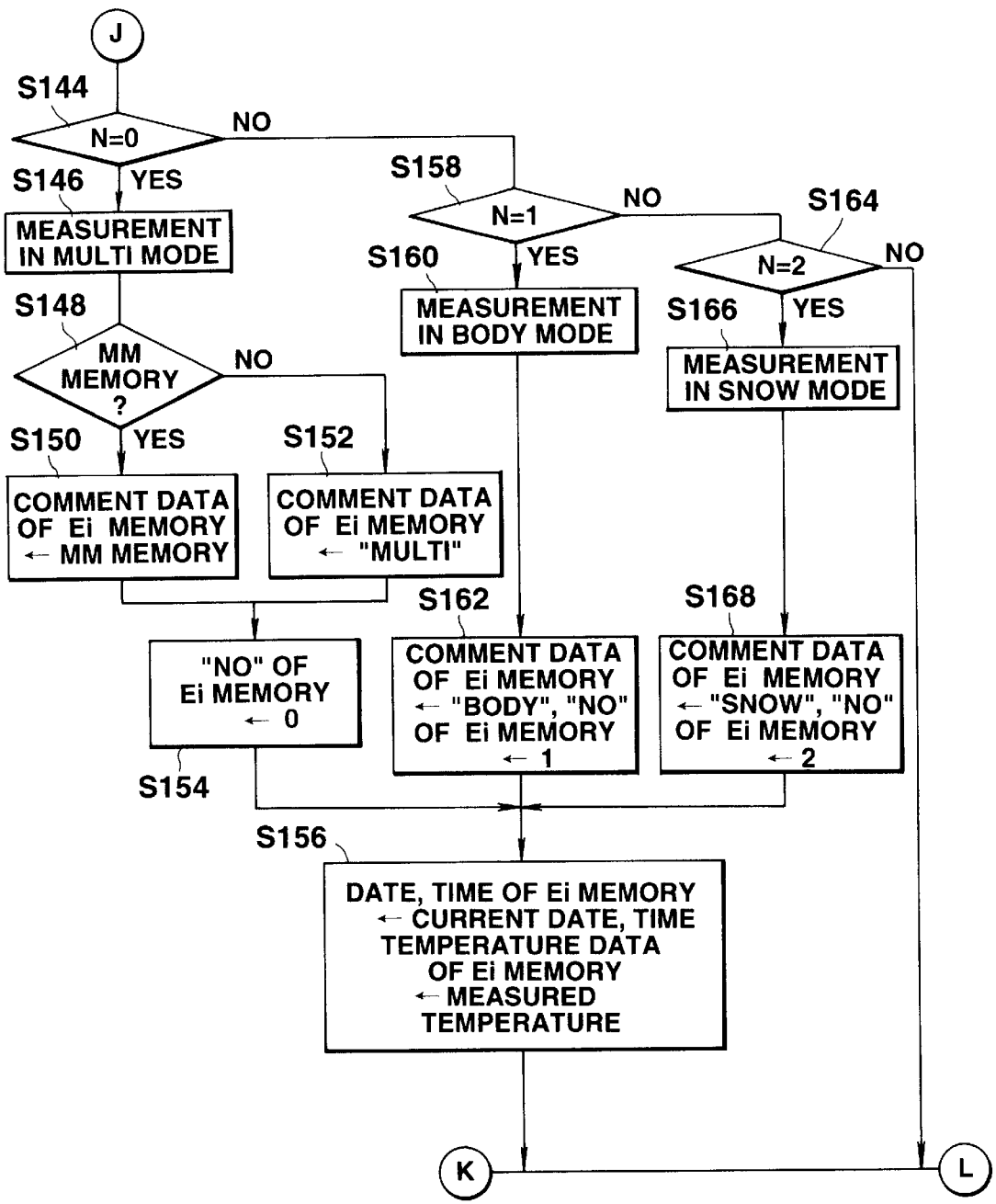
FIG. 13 is a flowchart of a switching process branching off from a step of FIG. 12.

After performing processes at step S140 and S142, it is judged at step S144 of FIG. 13 whether a value of the register N is "0", i.e., whether the multi mode is set. When YES, measurement is made in the multi mode at step S146. At step S148, it is judged whether any letter has been memorized in the memory MM. When YES, letters memorized in the memory MM are transferred to a comment data area of the memory Ei. When it is determined that letters have not been memorized in the memory MM, the letters "MULTI" are transferred to the comment data area of the memory Ei. After finishing the processes at step S150 or at step S152, "0" is set to "No." of the memory Ei at step S154. Then, a current date and time are set to a date/time area of the memory Ei at step S156, and measured temperature data is set to a temperature data area of the memory Ei.

When it is determined at step S144 that the multi mode is set, measurement is made in the multi mode at step S146. At step S158, it is judged whether the register N is set to "1", i.e., whether the body mode is set. When YES, measurement is made in the body mode at step S160. Letters "BODY" are transferred to the comment data area of the memory Ei at step S162, and "1" is set to "No." of the memory Ei. Then, the operation goes to step S156.

When it is determined at step S158 that the body mode is not set, it is judged whether the register N is set to "2", i.e., whether the snow mode is set. When NO, the process is finished. When it is determined that the snow mode is set, measurement is made in the snow mode at step S166. Letters "SNOW" are transferred to the comment data area of the memory Ei at step S168, and "2" is set to "No." of the memory Ei. Then, the operation goes to step S156.

After transferring data of the memories E2–E50 to the memories E1–E49 or adding "1" to the register i in a process program from step S144 to step S168, measurement is made in the multi mode if the multi mode has been set. When letters are memorized in the memory MM, the letters memorized in the memory MM are transferred to the comment data area of the memory Ei. When letters are not memorized in the memory MM, the letters "MULTI" are transferred to the comment data area of the memory Ei. Then, since measurement is made in the multi mode, "0" is set to the "No." of the memory Ei. Then, the current date and time are set to a date/time area of the memory Ei, and measured temperature data is set to a temperature data area of the memory Ei.

After transferring data of the memories E2–E50 to the memories E1–E49 or adding "1" to the register i, measurement is made in the body mode if the body mode has been set. Letters "BODY" are transferred to the comment data area of the memory Ei and "1" is set to the "No." of the memory Ei. Then, the current date and time are set to a date/time area of the memory Ei, and measured temperature data is set to a temperature data area of the memory Ei.

Further, after transferring data of the memories E2–E50 to the memories E1–E49 or adding "1" to the register i, measurement is made in the snow mode if the snow mode has been set. Letters "SNOW" are transferred to the comment data area of the memory Ei and "2" is set to the "No." of the memory Ei. Then, the current date and time are set to a date/time area of the memory Ei, and measured temperature data is set to a temperature data area of the memory Ei.

Figure 14:
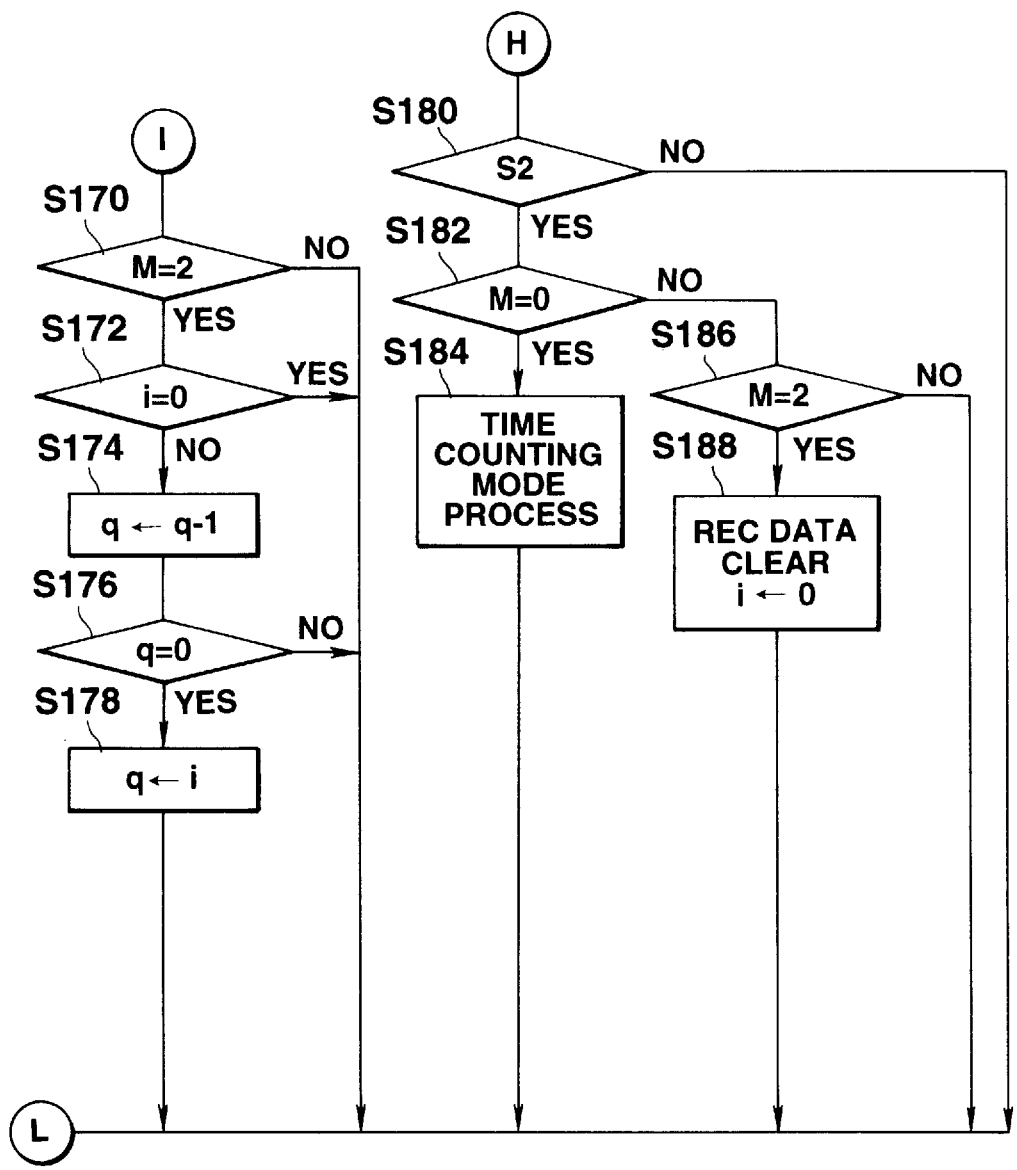
FIG. 14 is a flowchart of a switching process branching off from steps of FIG. 12.

When it is determined at step S128 that the register M is not set to "1", i.e., that the temperature measuring mode is not set, it is judged at step S170 of FIG. 14 whether the register M is set to "2", i.e., it is judged whether the recall mode is set. When NO, the process is finished. When it is determined that the recall mode is set, it is judged at step S172 whether the register i is set to "0". When YES, the process is finished. When NO (when it is determined that the register i is not set to "0"), "1" is subtracted from a value of the register q at step S174. It is judged at step S176 whether the register q is set to "0". When it is determined that the register q is not set to "0", the process is finished. When it is determined that the register q is set to "0", the value of the register i is transferred to the register q at step S178.

When it is determined at step S126 that the switch SL is not operated, it is judged at step S180 whether the switch S2 is operated. When NO, the process is finished. When it is determined that the switch S2 is operated, it is judged at step S182 whether a value of the register M is "0", i.e., whether the time mode is set. When YES, a process of the time mode is executed and the process is finished. When it is determined that the time mode is not set, it is judged at step S186 whether a value of the register M is "2", i.e., whether the recall mode is set. When NO, the process is finished. When YES (when it is determined that the recall mode is set), recall data is cleared at step S188 and "0" is set to the register, and, then, the process is finished.

During the process program at steps S170–S178, when it is determined that the switch SL is operated in the recall mode, and when a value of the register i is not "0", "1" is subtracted from the register q. When a value of the register q is "0", the value of the register i is set to the register q, and the process is finished.

When the switch S2 is operated in the time mode during the process program at steps S18–S188, process is executed in the time mode. When the switch S2 is operated in the recall mode, recall data is cleared and the register i is set to "0".

Figure 15:
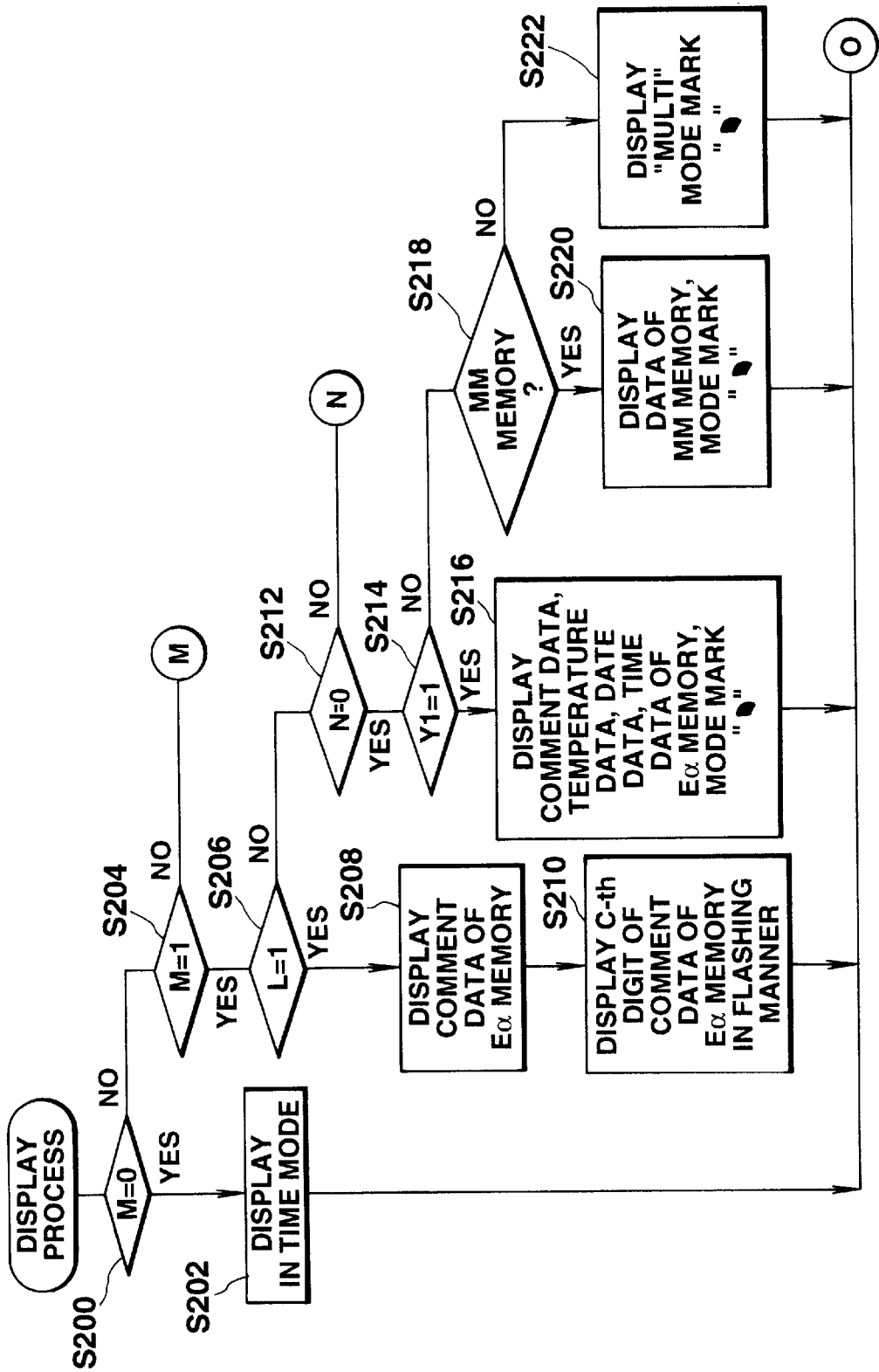
FIG. 15 is a flowchart of a display process of the wrist watch in the first embodiment of the present invention.
Figure 16:
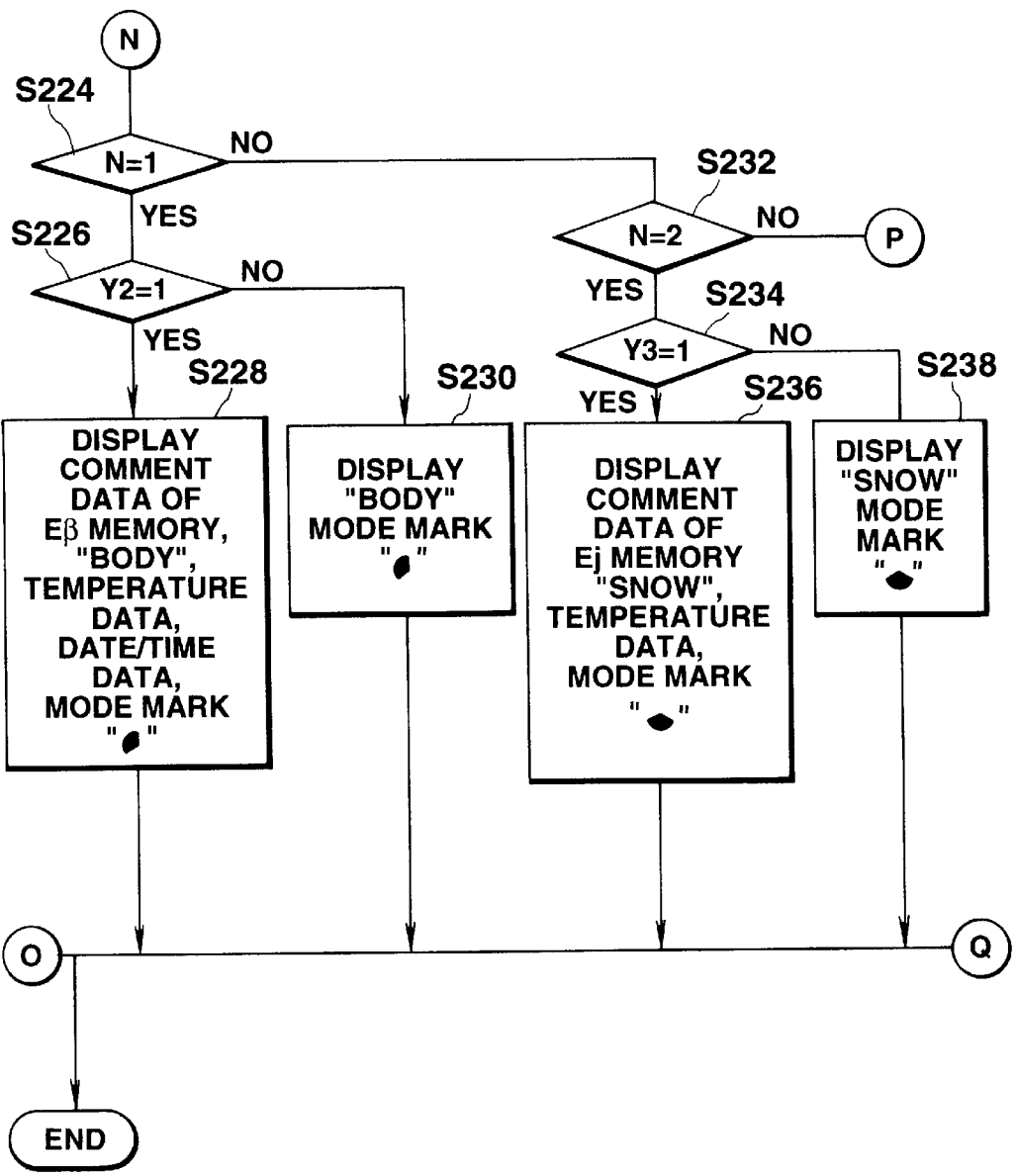
FIG. 16 is a flowchart of a display process branching off from a step of FIG. 15.
Figure 17:
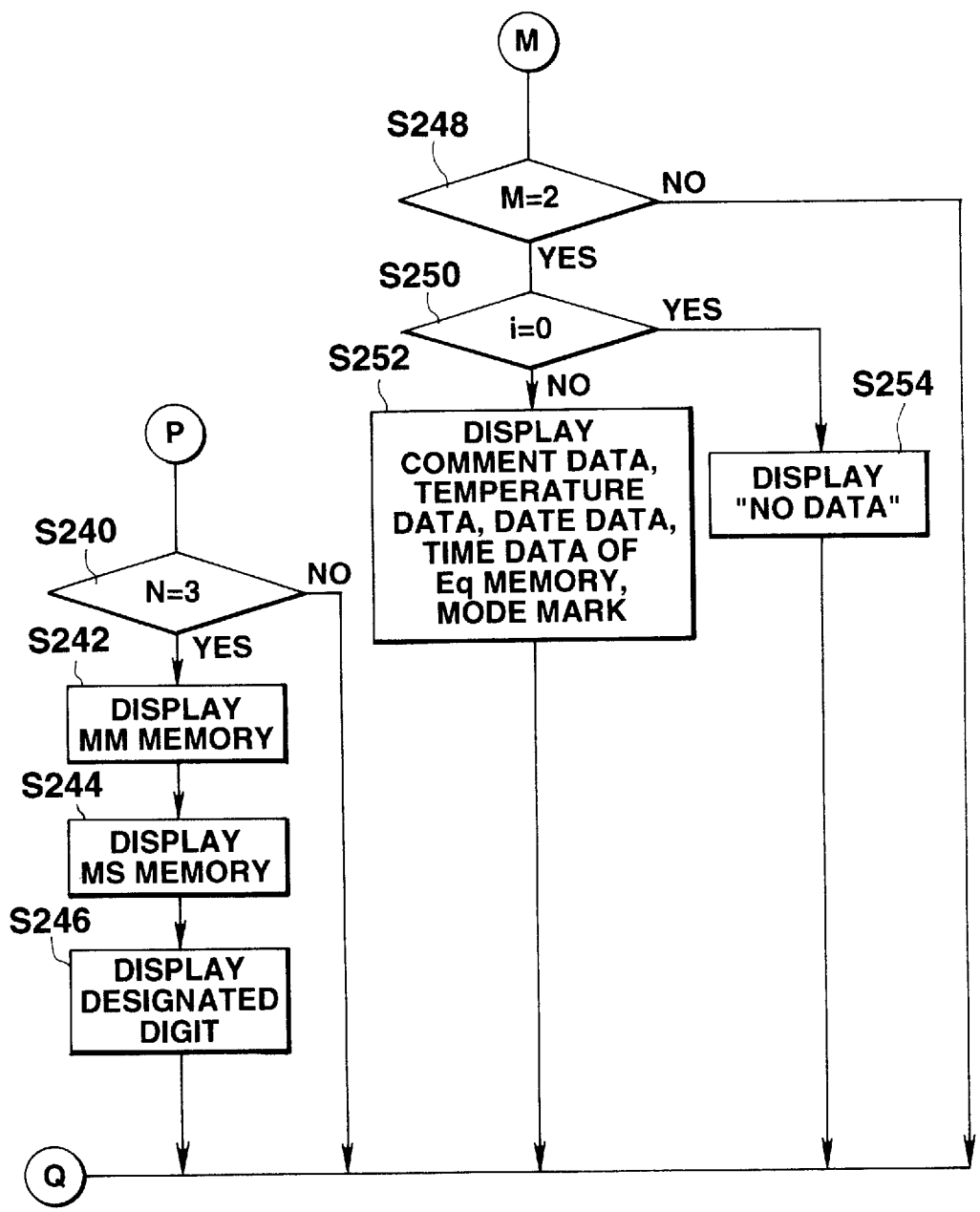
FIG. 17 is a flowchart of a display process branching off from steps of FIGS. 15 and 16.

(III) Display Process:

FIGS. 15–17 are flow charts of a display process.

It is judged at step S200 of FIG. 15 whether a value of the register M is "0", i.e., whether the time mode is set. When YES, a display process is executed in the time mode at step S202 and the process is finished. When it is determined that the time mode is not set, it is judged at step S204 whether a value of the register M is "1", i.e., whether the temperature measuring mode is set. When YES, it is judged at step S206 whether a value of the register L is "1", i.e., whether the letter input mode is set. When YES, comment data memorized in the comment data area of the memory Eα is displayed. Then, the C-th digit of the comment data of the memory Ea is displayed in a flashing manner at step S210, and the process is finished. That is, a place in the comment data where data input is waited for is displayed in a flashing manner.

When it is determined at step S206 that the register L is not set to "1", i.e., that the temperature measuring mode is not set, it is judged at step S212 whether the register N is set to "0", i.e., it is judged whether the multi mode is set. When YES, it is judged at step S214 whether the register Y1 is set to "1", i.e., whether temperature data measured in the multi mode is memorized. When YES (when it is determined that temperature data measured in the multi mode is memorized), data memorized in the comment data area of the memory Eα, data memorized in the temperature data area and data memorized in the date/time data area are displayed and further the mode mark 62b is displayed in step 216. Then the process is finished.

When it is determined that temperature data measured in the multi mode is memorized, it is judged at step S218 whether data is memorized in the memory MM, i.e., whether any letter is entered in the letter input mode. When it is determined at step S218 that letters are entered in the letter input mode, data memorized in the memory MM is displayed at step S220 and the mode mark 62b is displayed. When it is determined that no letter is entered, letters "MULTI" together with the mode mark 62b are displayed at step 222. Then, the process is finished.

When the value of the register M is "0" in the process program at steps S200–S222, the time mode is displayed. When the value of the register M is "1", the value of the register L is "0", the value of the register N is "0", and the value of the register Y1 is "1", an indication of the multi mode is displayed. When the value of the register M is "1", the value of the register L is "0", the value of the register N is "0" and the value of the register Y1 is "0", and when any data is memorized in the memory MM, data of the memory MM is displayed together with the mode mark 62b in the multi mode. In this case, when no data is memorized in the memory MM, the letters "MULTI" are displayed together with the mode mark 62b.

When it is determined at step S212 that the register N is not set to "0", i.e., that the multi mode is not set, it is judged at step S224 of FIG. 16 whether the register N is set to "1", i.e., it is judged whether the body mode is set. When YES, it is judged at step S226 whether the register Y2 is set to "1", i.e., whether temperature data measured in the body mode is memorized. When YES (when it is determined that temperature data measured in the body mode is memorized), data memorized in the comment data area of the memory Eβ, data memorized in the temperature data area and data memorized in the date/time data area are displayed at step S228 and further letters "BODY" together with the mode mark 62a are displayed. Then the process is finished. When it is determined that temperature data measured in the body mode is not memorized, the letters "BODY" are displayed together with the mode mark 62a at step S230, and the process is finished.

When it is determined at step S224 that the register N is not set to "1", it is judged at step S232 whether the register N is set to "2", i.e., it is judged whether the snow mode is set. When YES, it is judged at step S234 whether the register Y3 is set to "1", i.e., whether temperature data measured in the snow mode is memorized. When YES (when it is determined that temperature data measured in the snow mode is memorized), data memorized in the comment data area of the memory Ej, data in the temperature data area and data in the date/time data area are displayed at step S236 and further letters "SNOW" together with the mode mark 62c are displayed. Then the process is finished.

When a value of the register M is "1", a value of the register L is "0", a value of the register N is "1" and a value of the register Y2 is "1" in the process program at steps S224–S238, an indication of the body mode is displayed together with the mode mark 62a. In this case, when the value of the register Y2 is "0", an indication of the body mode "BODY" is displayed together with the mode mark 62a. When the value of the register M is "1", the value of the register L is "0", the value of the register N is "2" and a value of the register Y3 is "1", an indication of the snow mode is displayed together with the mode mark 62c. In this case, when the value of the register Y3 is "0", the letters "SNOW" are displayed together with the mode mark 62c.

When it is determined at step S232 that the value of the register N is not "2", it is judged at step S240 of FIG. 17 whether the value of the register N is "3", i.e., whether the set mode is set. When NO, the process is finished. When YES (when the set mode is set), data memorized in the memory MM is displayed at step S242. That is, letters input in the set mode are displayed, and data memorized in the memory MS are displayed at S244. That is, an emissivity set in the set mode is displayed. A designated digit is displayed in a flashing manner at step S246, and the process is finished.

When it is determined at step S204 that the value of the register M is not "1", it is judged at step S248 whether the value of the register M is "2", i.e., whether the recall mode is set. When NO, the process is finished. When YES (when the recall mode is set), it is judged at step S250 whether the register is set to "0", i.e., whether a temperature has been measured. When it is determined that temperature measurement has been made at least once, data memorized in the comment data area of the memory Eq, data in the temperature data area and data in the date/time data area are displayed together with the mode mark 62b at step S252, and the process is finished. When it is determined that temperature measurement has not been made, an indication of "NO DATA" is displayed at step S254, and the process is finished.

When the value of the register M is "1", the value of the register L is "0" and the value of the register N is "3" in the process program at steps S240–S254, input letters memorized in the memory MM and the emissivity memorized in the memory MS are displayed and a designated digit is displayed in a flashing manner. When the value of the register M is "2" and the value of the register i is "0", an indication of "NO DATA" is displayed. In this case, when the value of the register i is not "0", an indication of the recall mode is displayed together with the mode mark 62b.

In the above embodiment of the thermometer, the thermopile is used as the temperature sensor 7 for measuring a temperature on an external surface of an object. A thermo type sensor such as a current collector element which measures an amount of infrared light radiated from an object under measurement may be used to measure a temperature of the object. Further, in place of the thermometer such as the above thermopile and current collector element, a thermistor whose electric resistance varies with temperature may be used to measure temperatures inside and outside a house.

Further, in the above embodiment, letters are input to designate an object under measurement and the input letters are memorized in correspondence with obtained temperature data. Confirming the input letters displayed on the display unit, a user can recognize without any mistake what the object under measurement is. To make the user's input operation simple and effective, icons representing objects under measurement may be used instead of letters. That is, the icons are input together with measured temperature data and are displayed on the display unit. Then, the user can omit letter input operation. Further, the user himself may write an icon representing the object under measurement. A lot of icons may be prepared before hand and a menu including these icons may be displayed on the display unit. Then, the user may select an appropriate icon in the displayed menu with a simple operation.

Letters and icons may be input and displayed in combination to make sure what object is under measurement.

Letters relating to an object under measurement may be memorized in combination with measured temperature data, and further a numeral may be assigned to the object. Then, the letters and numeral may be used in combination to designate the object. For example, a numeral assigned to an object under measurement may be input when letters are input, and then the numeral including, for example, two digits may be displayed at the right side on the display unit 6 (FIG. 5).

Further, data are only displayed in the above embodiment of the thermometer, but the thermometer may be provided with a data output function of sending data to a printer and data will be printed on a sheet of paper. Data may be sent to a personal computer or an electronic notebook to be memorized therein. Memorized data may be converted into optical data to be output.

In the above embodiment of the thermometer, the thermometer is incorporated in a wrist watch but the thermometer may be used alone. The thermometer which is used alone may be provided with the data output function.

SECOND EMBODIMENT

Figure 18:
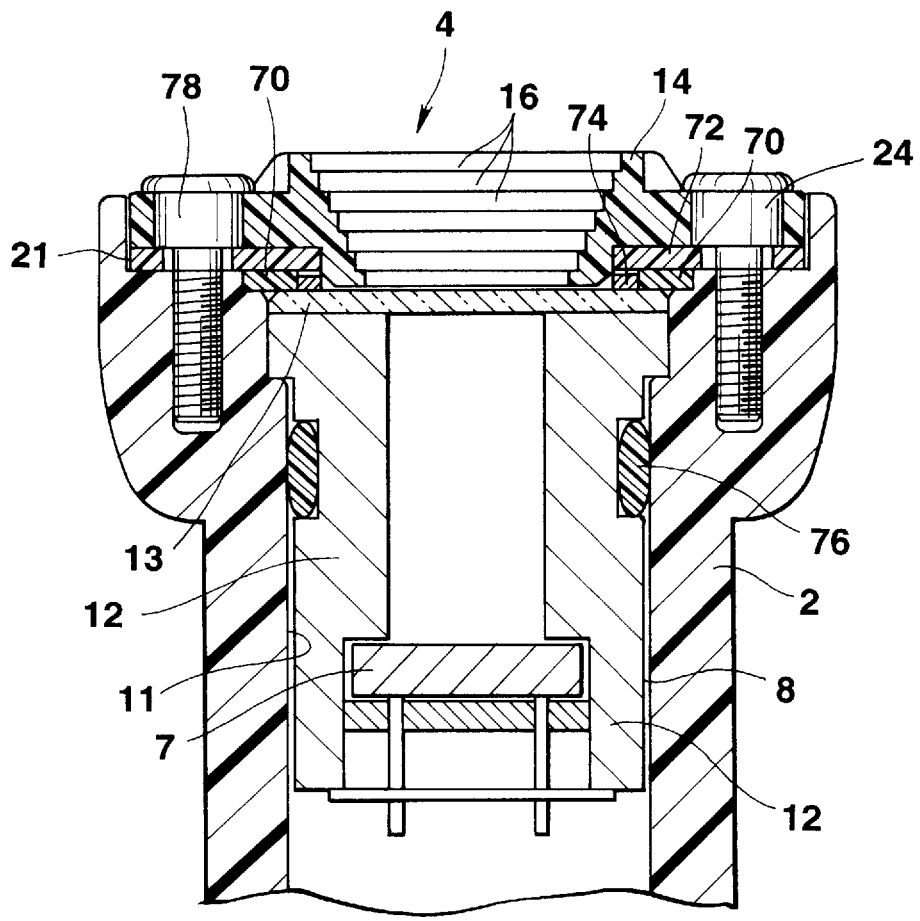
FIG. 18 is a cross sectional view of a subject portion in the vicinity of an opening formed in a casing in a second embodiment of the present invention.

FIG. 18 is a view showing a second embodiment of the present invention. In FIG. 18, like elements as those in FIGS. 1–3 are designated by like reference numerals, and their description will be omitted.

As shown in FIG. 18, in the electronic wrist watch with a temperature measuring function, an O-ring 70 is positioned on a boundary between the peripheral portion of the window member 13 and the hole 11. A ring 74 is provided inside the O-ring 70 to prevent the same from being shrunk when pressure is applied. A ring-like plate 21 is provided between the O-ring 20 with the ring 72 attached and the cover 14. Shock absorbing member 76 is provided between the holder 12 of the sensor module 8 and the inner surface of the hole 11. The shock absorbing member 76 resiliently supports the holder 12 in the hole 11, absorbing shock which is expected to be applied to the sensor module 8 in a direction perpendicular to an axis of the holder 11 when the wrist watch 1 is fallen on the ground.

The cover 14 is secured to the casing 2 by means of plural screws 24, tops of which engage with the cover 14, and shafts of which pass through openings formed in the ring-like plate 72 and are screwed into the casing 2. When the plural screws 24 are driven to the casing 2, the ring-like plate 72 urges the O-ring 70 onto the window member 13, whereby the O-ring 70 is deformed to make tight contact with the window member 13 and the casing 2. As a result, the inside of the hole 11 is kept airtight.

In the second embodiment of the electronic wrist watch with a temperature measuring function, the O-ring 70 provided between the cover 14 and the window member 13, and the ring-like plate 72 urging the O-ring 70 shield the sensor module 8, and further keep airtight the electronic wrist watch incorporating the sensor module 8. Even being applied with pressure, the O-ring 70 is prevented from being deformed by the ring 74 attached to the O-ring 70, the window member 13 and the ring-like plate 21. Further, the shock absorbing member 76 provided between the sensor module 8 and the inner surface of the hole 11 absorbs shock which will be caused when the wrist watch falls on the ground to protect the sensor module 8 from the mechanical shock.

THIRD EMBODIMENT

Figure 19:
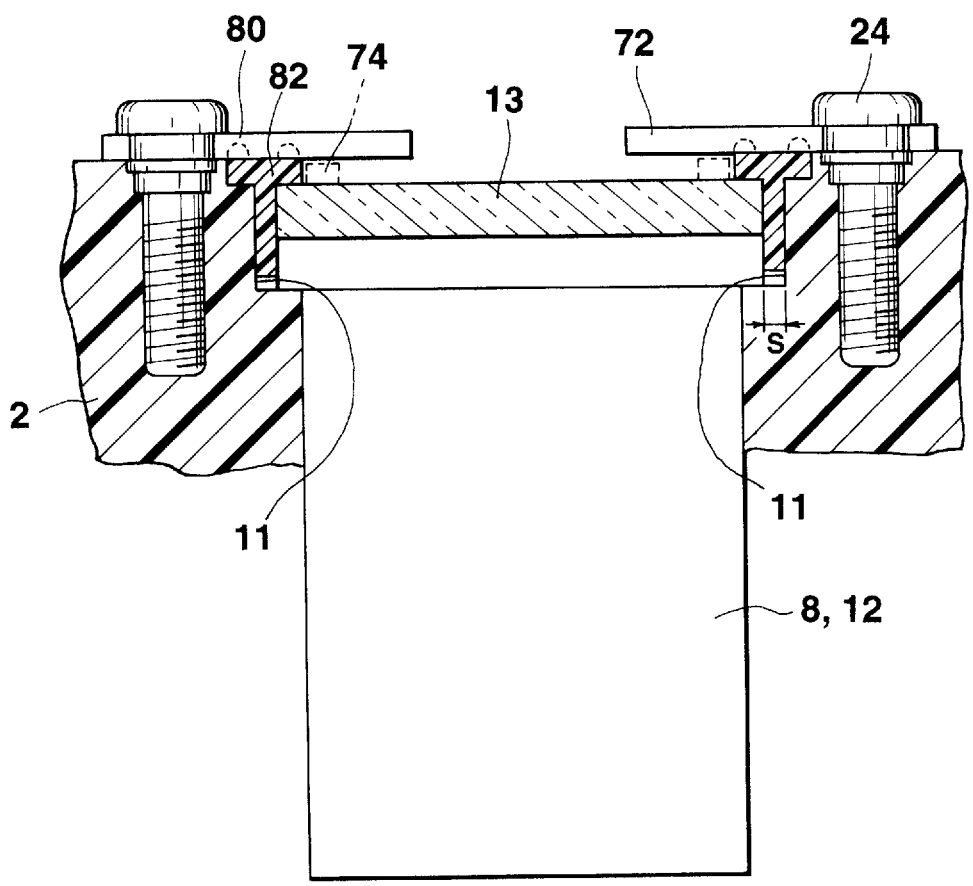
FIG. 19 is a cross sectional view of a portion in the vicinity of an opening formed in a casing in a third embodiment of the present invention.

FIG. 19 is a view showing a third embodiment of the electronic wrist watch according to the present invention. Similarly, like elements as those in FIGS. 1–3, 18 are designated by like reference numerals in FIG. 19, and their further description will be omitted.

In the embodiment of the electronic wrist watch with a temperature measuring function of FIG. 19, there is provided a space S of a predetermined width between the window member 13 and the hole 11. A cylindrical portion 82 which is formed integrally and co-axially with the O-ring 80 is inserted into the space S. The cylindrical portion 82 of the O-ring 80 has a thickness approximately equivalent to the width of the space S.

In the instant embodiment of the electronic wrist watch, since the O-ring 80 is integrally formed with the cylindrical portion 82 and is made too strong to be deformed, the O-ring 80 does not need to be reinforced by the ring 74, which is required in the second embodiment. Therefore, number of parts is decreased. In addition, since the outside and inside of the hole 11 are separated by the O-ring 80 with the cylindrical portion 82, improvement is further made in airtightness and watertightness between the outside and inside of the hole 11.

Further, since the peripheral portion of the window member 13 is covered with the cylindrical portion 82 of the O-ring 80, direct contact is prevented between an external wall of the window member 13 and the internal subsurface of the hole 11. Therefore, the window member 13 is protected from breakage caused by shock at the time the wrist watch falls onto the ground.

FOURTH EMBODIMENT

Figure 20:
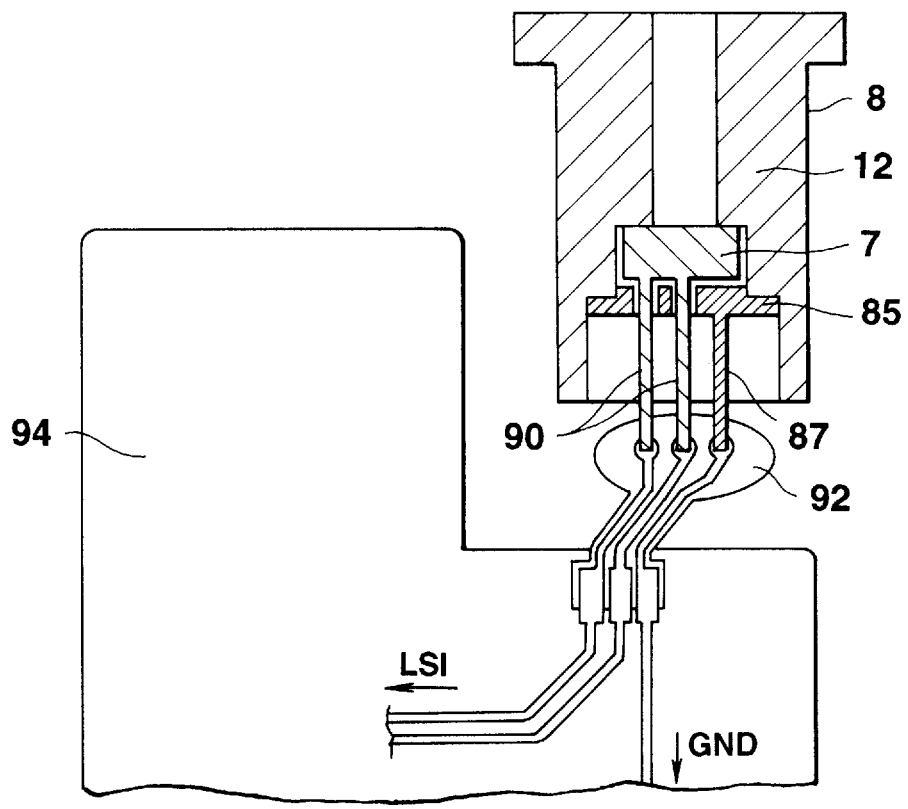
FIG. 20 is a cross sectional view of a holder in a fourth embodiment of the present invention.

FIG. 20 is a view showing a fourth embodiment of the electronic wrist watch with a temperature measuring function according to the present invention. In FIG. 20, like elements as those in FIGS. 1–3 are designated by like reference numerals, and their description will be omitted. In the instant embodiment of the electronic wrist watch of FIG. 20, onto the bottom of the metal holder 12, in which the thermopile 7 of the sensor module 8 is installed, is pressed a metal pedestal 85. The metal pedestal 85 is integrally formed with a ground terminal (GND) 87. On the metal pedestal 85 is mounted the thermopile 7, from which output terminals 90 thereof are extended.

The ground terminal 87 of the metal pedestal 85 and the output terminals 90 of the thermopile 7 are connected through a flexible board 92 respectively to a ground line and a large scale integrated circuit (LSI) mounted on a circuit board 94 of the wrist watch 1.

In the above structure of the electronic wrist watch with a temperature measuring function, when, for example, static electricity is induced in the casing 2 of the wrist watch 1, the static electricity flows from the holder 12 to ground through the metal pedestal 85, the ground terminal 87 and the flexible board 92. Therefore, the static electricity does not flow into output terminals 90 of the LSI to make the LSI work in error, or does not destroy the LSI.

In the above first to fourth embodiments, the electronic wrist watches, in which the thermopiles are installed, have been described, but the invention is not limited to these embodiments. The present invention may be applied to other electronic devices in which a similar thermopile is installed, such as electronic notebooks, electronic calculators and the like.

FIFTH EMBODIMENT

A fifth embodiment of a thermometer according to the present invention will be described with reference to FIGS. 21–30.

Figure 21:
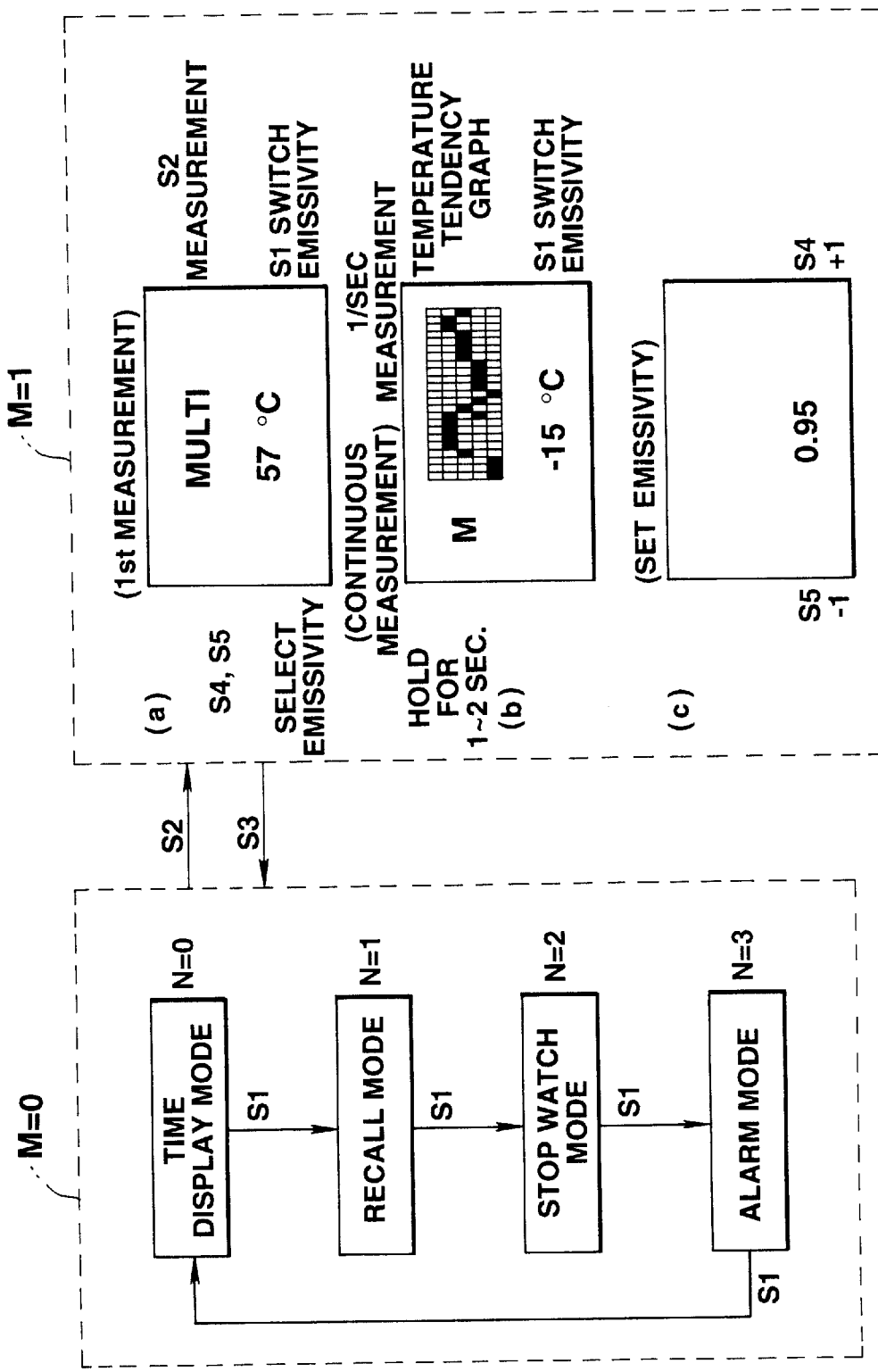
FIG. 21 is a view showing transitive mode indications displayed on the display unit of the wrist watch in a fifth embodiment of the present invention.

A wrist watch incorporating the embodiment of the thermometer according to the present invention has a similar external view to that shown in FIG. 1 and a circuit diagram thereof is also similar to shown in FIG. 4. Further description thereof will be omitted. In FIG. 1, reference numerals S1, S2, S3, SL and Sa stand for switches for executing various functions, which switches are mounted in side walls of the wrist watch 1. FIG. 21 is a view illustrating a transition of operation modes. Every operation of the switch S1 in a non-measurement mode (M=0) switches the operation mode in the cyclical order of a time mode (N=0), a recall mode (N=1), a stop watch mode (N=2) and an alarm mode (N=3) and the time mode (N=0). Operation of the switch S2 switches the non-measurement mode (M=0) to a measurement mode (M=1) and operation of the switch S3 switches the measurement mode (M=1) to the non-measurement mode (M=0).

In the measurement mode (M=1), when temperature measurement is made once, a temperature 57° C. and a mode indication "MULTI" are displayed as shown at (a) in FIG. 21. When the body mode is set, an mode indication "BODY" is displayed instead of the mode indication "MULTI". When temperature measurement is successively made, a temperature −15° C., an mode indication M (representing a multi mode) and a graph showing a temperature tendency are displayed as shown at (b) in FIG. 21. Every measured temperature is indicated by a dot in the graph. When an emissivity is set, an emissivity 0.95 is displayed as shown at (c) in FIG. 21.

Figure 22:
FIG. 22 is a view showing transitive indications displayed on the display unit in a time mode of the wrist watch in the fifth embodiment.

FIG. 22 is a view showing various indications displayed in the non-measurement mode. In the time mode, the year of Christ. 19 94, date 6-30, a time 10:58 50 and the day of the week WED are displayed as shown at (d) in FIG. 22. In the recall mode (RECALL), number of memorized temperature data (multi mode 15, body mode 20) and a mode indication REC (representing the recall mode) are displayed in an initial indication, as shown at (e) in FIG. 22. In the following indication of each operation mode (the multi mode, the body mode), a temperature, time and date of temperature measurement, a mode indication such as M and B, a read out No. (No. and a graph showing a temperature tendency are displayed, as shown at (f) and (g) in FIG. 22. In these indications, letters "A" and "P" appearing in front of time (6:30, 10:30) represent "a.m." and "p.m.", respectively. In the stop watch mode (ST-W), a mode indication ST-W (representing the stop watch mode) and a measurement time 00' 00"00 are displayed as shown at (h) in FIG. 22. In the alarm mode (ALM), a mode indication ALM1 (representing the alarm mode) and an alarm time 12:00 are displayed as shown at (i) in FIG. 22.

Figure 23:
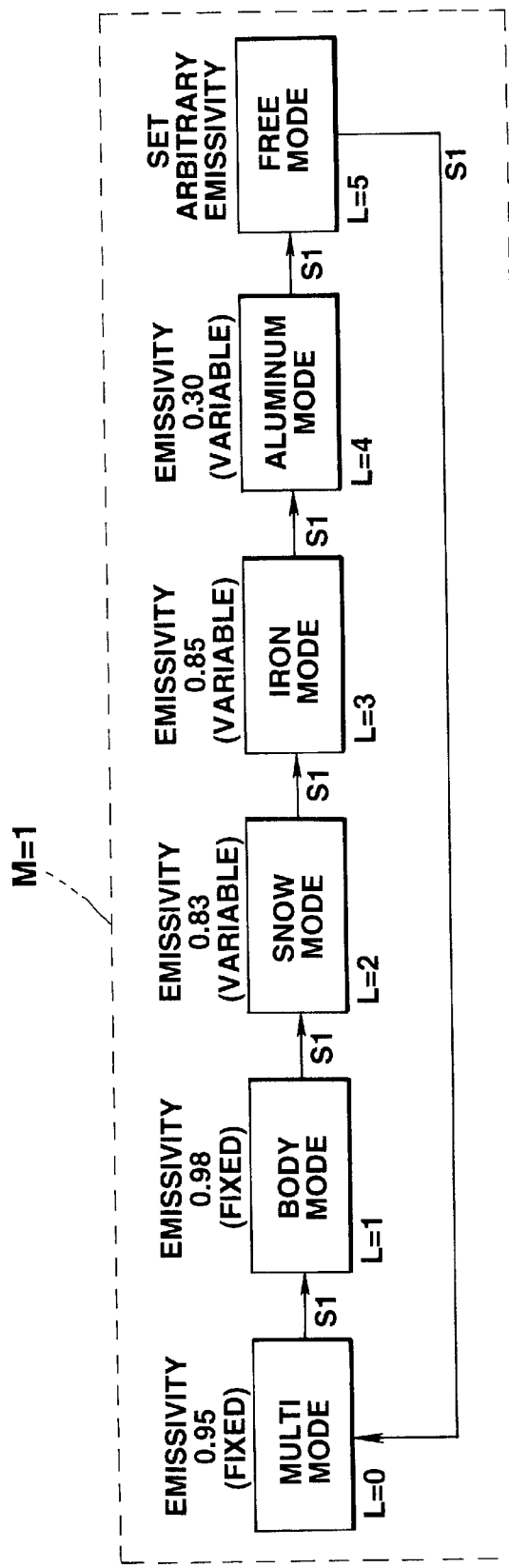
FIG. 23 is a view showing transitive mode indications displayed on the display unit in a measurement mode of the wrist watch in the fifth embodiment.

FIG. 4 is a circuit diagram of the wrist watch 1. The switch S1 of the switch input unit 28 is for selecting an emissivity setting mode. In the measurement mode (M=1), every operation of the switch S1 successively selects an emissivity setting mode, for example, in the order of "0.95", "0.98", "0.83", "0.85", "0.30", "an arbitrary rate" (0.1–1.0), "0.95" and so on, as shown in FIG. 23. The first "0.95" is an emissivity in the multi mode (L=0). The next "0.98" is an emissivity in the body mode (L=1). "0.83" is an emissivity in a snow mode (L=2), "0.85" in an iron mode (L=3), and "0.30" in an aluminum mode (L=4). The arbitrary rate is set in an arbitrary setting mode (L=5).

Every operation of the switch S1 in the non-measurement mode (M=0) switches the operation mode in the cyclical order of the time mode, the recall mode, the stop watch mode, the alarm mode, time mode. Operation of the switch S2 in the non-measurement mode (M=0) switches the operation mode to the measurement mode (M=1). Following operation of the switch S2 starts measurement. Further, when the switch S2 is kept depresses over a holding time (for example, 1–2 seconds), temperatures of an object are successively measured based on a previously selected emissivity. In this way, temperature data are obtained at every predetermined time interval. When the switch S2 is depressed and released within the holding time, a temperature of the object is measured and one temperature data is obtained.

The switch S3 is for finishing measurement. Operation of the switch S3 in the measurement mode switches the operation mode to the non-measurement mode. The switch S4 is for setting an emissivity and for selecting an indication displayed on the display unit. As known in the art, an emissivity is expressed in terms of a ratio of an area defined by a characteristic curve of infrared light energy emitted from a perfect black body to an area defined by a characteristic curve of infrared light energy emitted from an object under measurement. Operation of the switch S4 in the measurement mode sets an emissivity. In this case, every operation of the switch S4 adds 0.01 to the previously set emissivity within the range of 0.1 to 1.0. Especially, in the snow, the iron and the aluminum modes, every operation of the switch S4 increases by 0.01 an emissivity in the vicinity of a reference set rate. For example, in a case where the emissivity is 0.83 in the snow mode, one operation of the switch S4 adds 0.01 to 0.83 to change the emissivity to 0.84.

Figure 24:
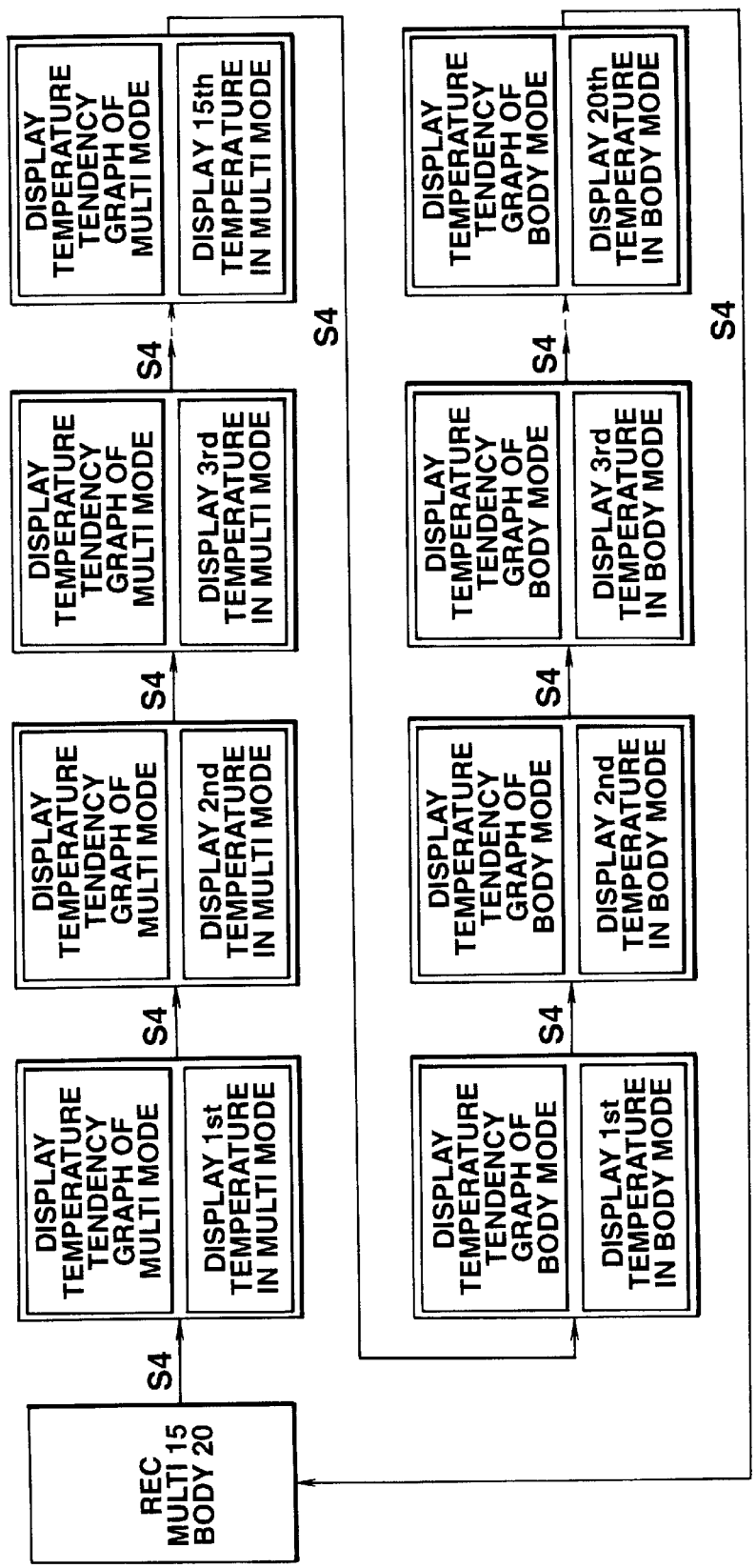
FIG. 24 is a view showing recalled measured data in a recall mode of the wrist watch in the fifth embodiment.

Operation of the switch S4 in the recall mode indicates temperature data of the same object or temperature data measured under the same emissivity with a value represented by the temperature data and a graph showing a temperature tendency. For example, assume that fifteen (15) temperature data of the same object are measured at the same emissivity in the multi mode and twenty (20) temperature data are measured at the same emissivity in the body mode. FIG. 24 is a view showing transition of indications on the display unit which are switched by operation of the switch S4. Temperature data measured at the same emissivity in the multi mode are successively displayed with values and temperature tendency graphs, and, then, temperature data measured at the same emissivity in the body mode are successively displayed with values and temperature tendency graphs.

Similarly, the switch S5 is for setting emissivities and for selecting indications on the display unit. Operation of the switch S5 in the measurement mode sets an emissivity. In this case, every operation of the switch S5 subtracts 0.01 from the previously set emissivity within the range of 0.1 to 1.0. Especially, in the snow, the iron and the aluminum modes, every operation of the switch S5 decreases by 0.01 an emissivity in the vicinity of the reference set rate. For example, in a case where the emissivity is 0.83 in the snow mode, one operation of the switch S5 subtracts 0.01 from 0.83 to change the emissivity to 0.82.

Operation of the switch S5 in the recall mode indicates temperature data of the same object or temperature data measured under the same emissivity with a value represented by the temperature data and a graph showing a temperature tendency. In this case, the display process is executed in an opposite way by operation of the switch S5 while the display process is executed in a forward way by operation of the switch S4.

In FIG. 4, a read only memory (ROM) 36 stores a program for controlling operation of the CPU 26, and emissivities 0.95 in the multi mode and 0.98 in the body mode. A random access memory (RAM) 38 includes various registers and is provided with memory areas and data memory areas.

FIG. 25 is a view illustrating a structure of the RAM 38, and the following registers and data memory areas are set in the RAM 38:

a display register: register which is used to display various data;

a current time register: register which is used to count time;

a stop watch register: a register which is used to count time for a stop watch function;

an alarm register: a register which is used for memorizing an alarm time;

M: a register used for switching operation modes;

M=0: non measurement mode; M=1: measurement mode;

N: a register used for switching operation modes in the non measurement mode;

N=0: time mode;

N=1: recall mode;

N=2: stop watch mode;

N=3: alarm mode;

L: a register used for switching emissivities in the measurement mode;

L=0: 0.95;

L=1: 0.98;

L=2: 0.83;

L=3: 0.85;

L=4: 0.30;

L=5: arbitrarily set (0.1 to 1.0);

BL2: a register for storing an emissivity corresponding to L=2;

BL3: a register for storing an emissivity corresponding to L=3;

BL4: a register for storing an emissivity corresponding to L=4;

BL5: a register for storing an emissivity corresponding to L=5;

P0, P1: address pointers for designating an address in the memory area where temperature data is stored;

Memory area: this memory area is divided into two areas, one is an emissivity data area for storing an emissivity selected from among emissivitys, other is a temperature data area for storing temperature data measured under a condition of the selected emissivity. For example, as shown in FIG. 25, "0" indicates the multi mode and "57" is temperature data measured in the multi mode. There are provided fifty memory areas in total, each including the above two areas. Further, date and time of measurement are also stored together with measured temperature data;

Now, operation of the embodiment of the wrist watch 1 with the above structure will be described referring to flow charts shown in FIGS. 26–29.

Figure 26:
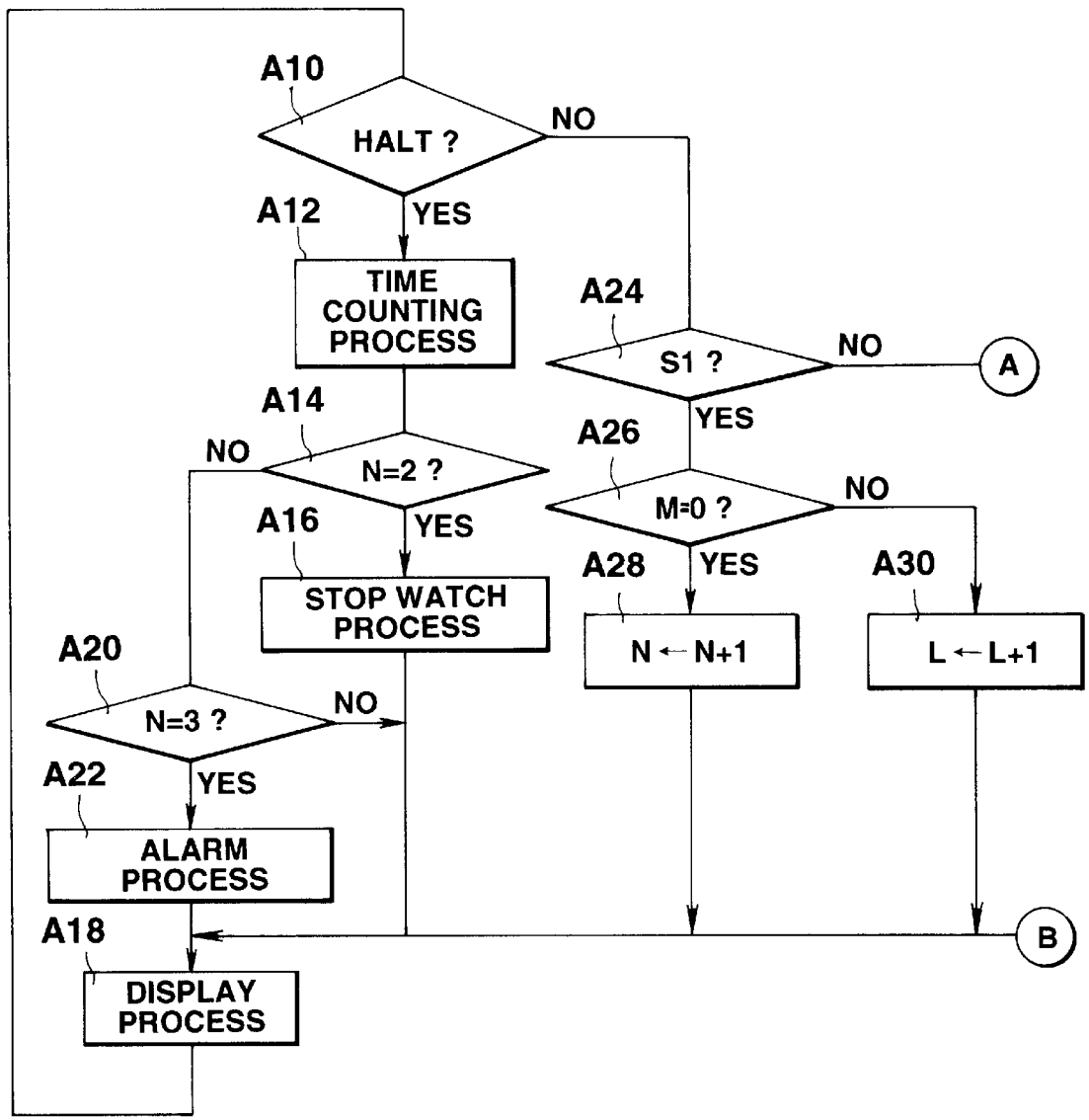
FIG. 26 is a flowchart of operation of the wrist watch in the fifth embodiment.
Figure 27:
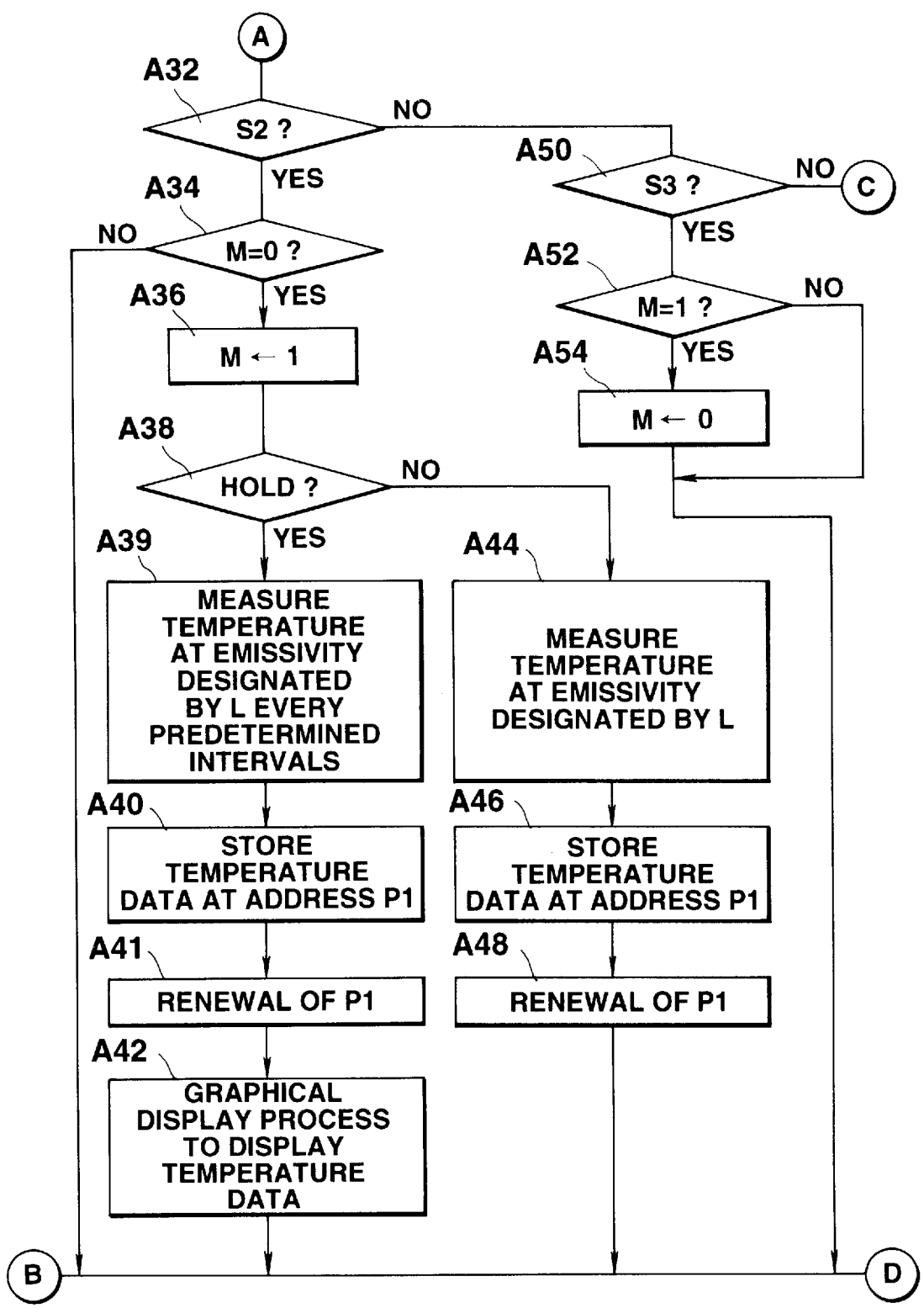
FIG. 27 is a flowchart of operation of the wrist watch in the fifth embodiment, branching off from a step of FIG. 26.
Figure 28:
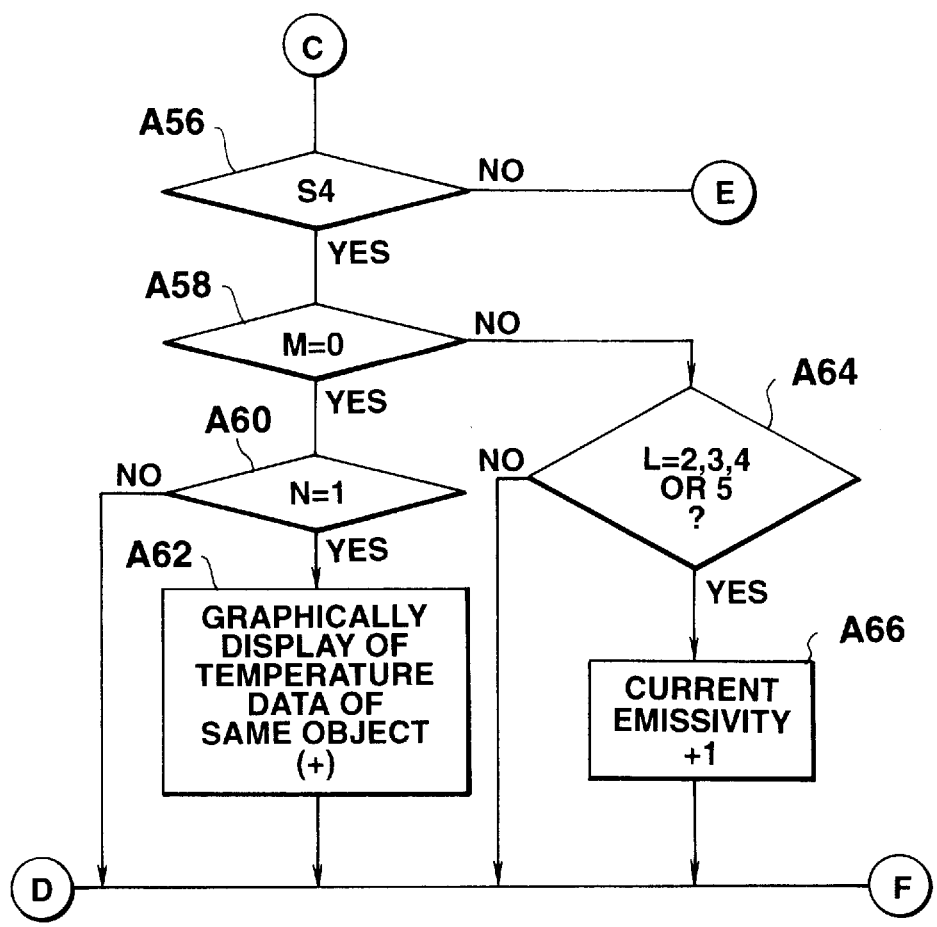
FIG. 28 is a flowchart of operation of the wrist watch in the fifth embodiment, branching off from a step of FIG. 27.
Figure 29:
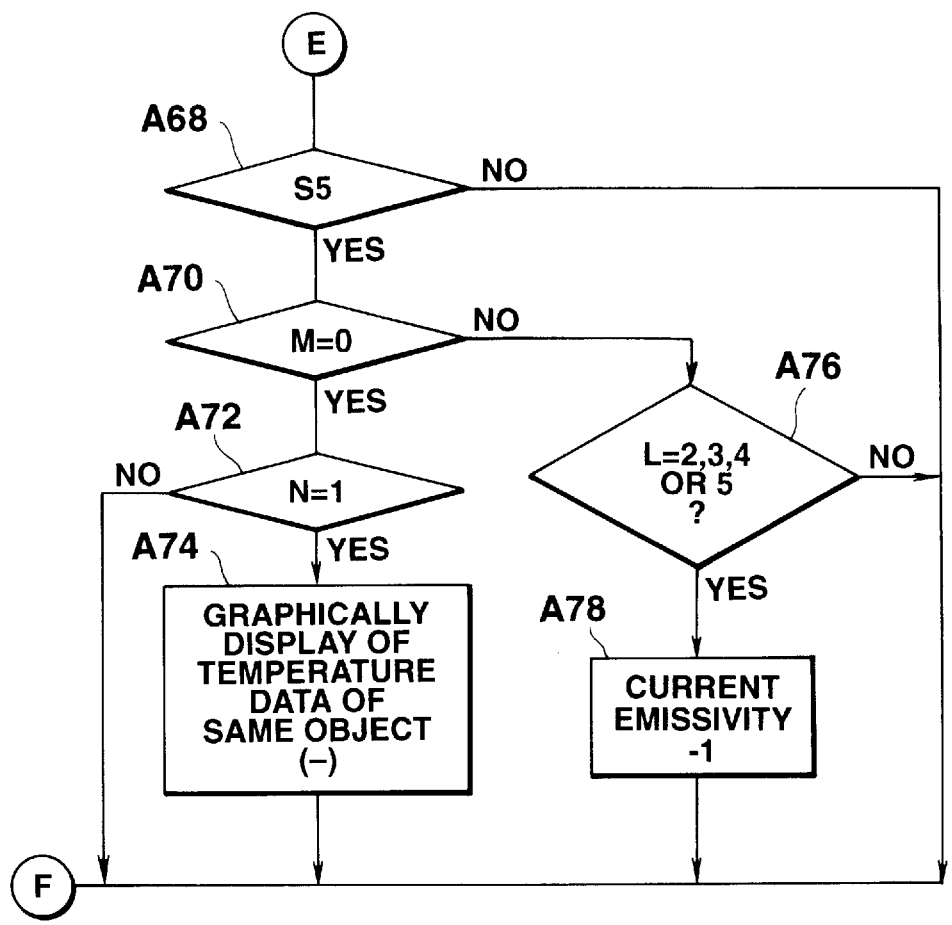
FIG. 29 is a flowchart of operation of the wrist watch in the fifth embodiment, branching off from a step of FIG. 28.

At step A10 of FIG. 26, it is judged whether any switch of the switch input unit 19 is operated. When NO (when it is determined that no switch of the switch input unit 19 is operated), a time counting process is performed at step A12. Further, it is judged at step A14 whether a value of the register N is "2", i.e., whether the stop watch mode has been set. When YES (when it is determined that the stop watch mode has been set), a stop watch process is performed at step A16 and a display process is executed at step A18 (refer to (h) in FIG. 22). When an operation is executed to start operation of the stop watch, the time counting process starts and time is displayed. The above processes are repeatedly executed during the stop watch process.

When it is determined at step A14 that the value of the register N is not "2", i.e., it is determined that the stop watch mode is not set, it is judged at step A20 whether the value of the register N is "3", i.e., whether the alarm mode has been set. When YES (when it is determined that the alarm mode has been set), an alarm process is performed at step A22 and the display process is executed at step A18 (refer to (i) in FIG. 22). When an operation is executed to start the alarm operation, the time counting operation starts. The above processes are repeatedly executed during the alarm process, and an alarm is generated when a set time is reached. An alarm generating circuit is omitted from the circuit diagram of FIG. 4. When the stop watch process and the alarm process are not performed, the time counting process is performed and time is displayed (refer to (d) in FIG. 22).

When it is determined at step A10 that a switch is operated, it is judged at step A24 whether the switch S1 was operated. When it is determined that the switch S1 was operated, it is judged at step A26 whether a value of the register M is "0", i.e., whether the switch S1 was operated in the non-measurement mode. When it is determined that the switch S1 was operated in the non-measurement mode, the register N is incremented by "1" at step A28. In this case, since an initial value of the register N is "0", the register N will be "1". When the register N is set to "1", the recall mode is set, and the indication in the recall mode is displayed at step A18 as shown at (e) in FIG. 22. When it is determined at step A26 that the switch S1 was not operated in the non-measurement mode, i.e., it is determined that the switch S1 is operated in the measurement mode, the register L is incremented by "1" at step A30. In this case, since an initial value of the register L is "0", the register L will be "1". When the register L is set to "1", an emissivity "0.98" is selected, i.e., the body mode is selected. After selection of the body mode, the emissivity "0.98" is displayed at step A18 as shown at (c) in FIG. 21.

When it is determined at step A24 that the switch S1 is not operated, it is judged at step A32 whether the switch S2 is operated. When it is determined that the switch S2 is operated, it is judged at step A34 whether a value of the register M is "0", i.e., whether the switch S2 is operated in the non-measurement mode. When it is determined that the switch S2 is operated in the non-measurement mode, the register M is incremented by "1" at step A36. The operation mod is switched to the measurement mode. It is judged at step A38 whether the switch S2 is kept depressed for more than a holding time (for example, 1–2 seconds). It is determined that the switch S2 is kept depressed for more than the holding time, a process is executed to at step A39 to make temperature measurement every predetermined time intervals under a condition of the emissivity designated by the value of the register L. For example, when the operation goes to step A39, a flag (not shown) is raised, and time measurement is made at predetermined times, for example, sixty times in every predetermined hour which are measured in the time counting process at step S12. Temperature data thus obtained are stored at addresses in the memory area designated by the address pointer P1 at step A40. After temperature data has been stored, the address pointer P1 is renewed at step A41 to designate a following address. Then, a graph display process is executed at step A42, and a temperature tendency graph is displayed at step A18 as shown at (b) in FIG. 21. During the above temperature measurement, obtained temperature data are not stored.

When the switch S2 is depressed and released within the holding time at step A38, temperature measurement is made once at step A44 under the condition of the emissivity designated by the value of the register L. At step A46 obtained temperature data is stored at an address in the memory area designated the address pointer P1. After temperature data has been stored, the address pointer P1 is renewed at step A48 to designate a following address. Then, temperature data is displayed at step A18 as shown at (a) in FIG. 21.

When it is determined at step A32 that the switch S2 is not operated, it is judged at step A50 whether the switch S3 is operated. When it is determined that the switch S3 is operated, it is judged at step A52 whether a value of the register M is "1", i.e., whether the switch S3 is operated in the measurement mode. When it is determined that the switch S3 is operated in the measurement mode, the register M is set to "0" at step A54. After the register M has been set to "0", the operation goes to step A18. When it is determined that the switch S3 is not operated in the measurement mode, the operation goes to step A18.

When it is determined at step A50 that the switch S3 is operated, it is judged at step A56 whether the switch S4 is operated. When it is determined that the switch S4 is operated, it is judged at step A58 whether the register M has been set to "0", i.e., it is judged whether the switch S4 is operated in the non-measurement mode.

When it is determined that the switch S4 is operated in the non-measurement mode, it is judged at step A60 whether a value of the register N is "1", i.e., whether the recall mode is set. When the recall mode has not been set, the operation goes to step A18. When the recall mode has been set, the operation goes to step A62, where a process is executed to display a temperature tendency graph based on temperature data of the same object, and the temperature tendency graph is displayed at step A18. In this case, temperature data at the same emissivity are selected from among temperature data stored in the memory area, and are successively displayed in every operation of the switch S4. The temperature data at the same emissivity are selected based on the values of the register L which are stored in combination with temperature data.

In the case that, for example, there are fifteen temperature data measured in the multi mode and twenty temperature data measured in the body mode, the first temperature data measured in the multi mode is read out and displayed based on a value "0" memorized in the memory area, upon operation of the switch S4 as described with reference to FIG. 24. Upon following operation of the switch S4, the second temperature data measured in the multi mode is read out and displayed based on a value "0" memorized in the memory area. Thereafter, similar processes are executed until the fifteenth temperature data measured in the multi mode is read out and displayed. After the fifteenth temperature data measured in the multi mode has been displayed, the first temperature data measured in the body mode is read out and displayed based on a value "1" memorized in the memory area, upon operation of the switch S4. Upon following operation of the switch S4, the second temperature data measured in the body mode is read out and displayed based on a value "1" memorized in the memory area. Thereafter, similar processes are executed until the twentieth temperature data measured in the body mode is read out and displayed. When the switch S4 is operated after the twentieth temperature data measured in the body mode is displayed, the first temperature data measured in the multi mode is read out and displayed. Temperature data are memorized in the memory area in the order of measurement.

When it is determined at step A58 that the switch S4 is not operated, i.e., it is determined that the switch S4 is operated in the measurement mode, it is judged at step A64 whether a value of the register L is "2", "3", "4" or "5". When it is determined that the value of the register L is "2", "3", "4" or "5", an emissivity corresponding to the value of the register L is set at step A66. That is, the current emissivity is incremented by "1". In other words, "0.01" is added to the current emissivity. For example, since an emissivity is 0.83 when the value of the register L is "2", the emissivity 0.84 is obtained by adding 0.01 to the current emissivity 0.83. When the switch S4 is operated again with the emissivity 0.84, the emissivity 0.85 is obtained. Obtained emissivities are displayed and set in the registers BL2–BL5 corresponding to the values of the register L every addition of 0.01 to the emissivity (refer to (c) in FIG. 21).

When it is determined at step A56 that the switch S4 is not operated, it is judged at step A68 whether the switch S5 is operated. When it is determined that the switch S5 is operated, it is judged at step A70 whether a value of the register M is "0", i.e., whether the switch S5 is operated in the non-measurement mode. When it is determined that the switch S5 is operated in the non-measurement mode, it is judged at step A72 whether a value of the register N is "1", i.e., whether the recall mode is set. When the recall mode is not set, the operation goes to step A18. When the recall mode is set, a process is executed at step A74 to display a temperature tendency graph of temperature data of the same object, and the temperature tendency graph is displayed at step A18. Operation of the switch S5 executes the display process in the opposite sequence from the display process by the switch S4. More specifically, when the switch S5 is operated with the third temperature data of the multi mode displayed in FIG. 24, the second temperature data of the multi mode is displayed.

When it is determined at step A70 that the switch S5 is not operated, i.e., it is determined that the switch S5 is operated in the measurement mode, it is judged at step A76 whether a value of the register L is "2", "3", "4" or "5". When it is determined that the value of the register L is "2", "3", "4" or "5", an emissivity is set at step A78. That is, the current emissivity is incremented by "−1". In other words, "0.01" is subtracted from the current emissivity. For example, since an emissivity is 0.83 when the value of the register L is "2", the emissivity 0.82 is obtained by subtracting 0.01 from the current emissivity 0.83. When the switch S4 is operated again with the emissivity 0.82, the emissivity 0.81 is obtained. Obtained emissivities are displayed and set in the registers BL2–BL5 corresponding to the values of the register L every subtraction of 0.01 from the emissivity. When it is determined at step A68 that the switch S5 is not operated, the operation goes to step A18.

In the above embodiment of the thermometer, the thermopile is used as the temperature sensor 7 for measuring a temperature on an external surface of an object. A thermo-type sensor such as a current collector element may be used to measure a temperature of the object.

Further, in the above embodiment, letters are input to designate an object under measurement and the input letters are memorized in correspondence with obtained temperature data. Confirming the input letters displayed on the display unit, a user can recognize without any mistake what the object under measurement is. To make user's input operation simple and effective, icons representing objects under measurement may be used instead of letters. That is, the icons are input together with measured temperature data and are displayed on the display unit. Then, the user can omit letter input operation. Further, the user may himself write an icon representing the object under measurement. A lot of icons may be prepared beforehand and a menu including these icons may be displayed on the display unit. Then, the user may select an appropriate icon in the displayed menu with a simple operation.

Letters and icons may be input and displayed in combination to make sure what object is under measurement.

Further, data are only displayed in the above embodiment of the thermometer, but the thermometer may be provided with a data output function of sending data to a printer and data will be printed on a sheet of paper. Data may be sent to a personal computer or an electronic notebook to be memorized therein. Memorized data may be converted into optical data to be output.

In the above embodiment of the thermometer, the thermometer is incorporated in a wrist watch, but the thermometer may be used alone. The thermometer which is used alone may be provided with the data output function.

Several embodiments of the present invention have been described in detail but these embodiments are simply illustrative and not restrictive. The present invention may be modified in various manners. All the modifications and applications of the present invention will be within the scope and spirit of the invention, so that the scope of the present invention should be determined only by what is recited in the present appended claims and their equivalents.

What is claimed is:

1. A thermometer, comprising:
   a first memory which stores fixed emissivity data and inputted emissivity data respectively corresponding to a plurality of types of objects;

an externally operable switch which is operable for selecting a respective one of the emissivity data stored in said first memory, corresponding to the emissivity of an object whose temperature is to be measured, before measurement of a temperature of the object;

a measuring device which measures a temperature of the object to obtain temperature data, said measuring device using the emissivity data selected by said externally operable switch to obtain said temperature data;

a second memory which stores a plurality of temperature data measured by said measuring device and corresponding to the temperature of the plurality of objects in combination with identification data which identifies the respective object under measurement; and a display device for reading temperature data stored in correspondence with the same identification data from among the plurality of temperature data stored in the second memory and for displaying the read temperature data.

2. A thermometer as claimed in claim 1, further comprising an emissivity data input device for inputting said inputted emissivity data to said thermometer; and wherein said first memory comprises:
 a first storing section which contains said fixed emissivity data; and
 a second storing section for storing said emissivity data inputted by said emissivity input device.

3. A thermometer as claimed in claim 2, wherein said first storing section contains at least an emissivity data of 0.95.

4. A thermometer as claimed in claim 1, wherein said display device comprises a graph display device for simultaneously displaying in a graphic form the read temperature data stored in correspondence with the same identification data read from said second memory.

5. A thermometer as claimed in claim 1, wherein said display device comprises a switch for selecting the read temperature data to be displayed.

6. A thermometer as claimed in claim 1, further comprising an identification data input for inputting said identification data.

7. A thermometer as claimed in claim 1, further comprising a time counter for producing date data;
 wherein the temperature data measured by said measuring device is stored in the second memory in combination with said identification data and said date data produced by said time counter.

8. A thermometer as claimed in claim 7, wherein said second memory comprises plural storing units which store combinations of the temperature data obtained by said temperature measuring device, said identification data and the date data obtained by said time counter.

* * * * *